United States Patent [19]

Masse et al.

[11] Patent Number: 5,700,494

[45] Date of Patent: Dec. 23, 1997

[54] DEVICE FOR PRODUCING A SHAPED CONFECTION OF EDIBLE MATERIALS COMBINED INTO CO-EXTENSIVE STRIPS

[75] Inventors: Robert Masse, St-Luc; Alain Dion, Marieville; Robert Bessette, St-Jean; Khiem Tran, Montreal, all of Canada

[73] Assignee: 9000-9226 Quebec Inc., Canada

[21] Appl. No.: 587,982

[22] Filed: Jan. 17, 1996

Related U.S. Application Data

[63] Continuation of Ser. No. 329,612, Oct. 26, 1994, abandoned, which is a continuation of Ser. No. 51,015, Apr. 22, 1993, abandoned, which is a continuation-in-part of Ser. No. 981,334, Nov. 25, 1992, abandoned.

[51] Int. Cl.$^6$ ............................ A23G 9/28; A23G 9/24; A23G 9/30; B29C 27/04
[52] U.S. Cl. .................... 425/131.1; 425/225; 425/447; 425/462; 426/516
[58] Field of Search .................... 425/131.1, 132, 425/461, 462, 145, 277, 225, 226, 447, 131.5; 426/516; 264/39

[56] References Cited

U.S. PATENT DOCUMENTS

| | | | |
|---|---|---|---|
| 2,239,408 | 4/1941 | Wallace | 425/227 |
| 3,272,388 | 9/1966 | Whitmore | |
| 3,420,268 | 1/1969 | Mueller et al. | |
| 3,436,789 | 4/1969 | Hays | 264/39 |
| 3,779,676 | 12/1973 | Bernard | 425/131.1 |
| 4,698,193 | 10/1987 | Bernitz et al. | 425/131.1 |
| 4,702,687 | 10/1987 | Wheeler et al. | 425/227 |
| 4,768,243 | 9/1988 | Kehoe | 425/131.1 |
| 4,856,975 | 8/1989 | Gearhart | 425/462 |
| 4,859,165 | 8/1989 | Hoashi | 425/131.1 |
| 4,881,663 | 11/1989 | Seymour | |
| 4,913,645 | 4/1990 | Daouse et al. | 425/150 |
| 4,925,380 | 5/1990 | Meisner | 425/131.1 |
| 5,112,548 | 5/1992 | Roberts et al. | 425/131.1 |

FOREIGN PATENT DOCUMENTS

| | | |
|---|---|---|
| 0 503 254 | 9/1992 | European Pat. Off. |
| 2.223.645 | 10/1974 | France |
| 2 261 181 | 9/1975 | France |
| 1705115 | 1/1992 | U.S.S.R. ............ 425/225 |

*Primary Examiner*—Khanh P. Nguyen
*Attorney, Agent, or Firm*—Larson and Taylor

[57] ABSTRACT

A device for producing a continuous formed confection of frozen dairy product and flavoring gel combined in co-extensive strips. The device includes an extrusion die provided with a shaping bore for extrusion-forming the frozen dairy product and a channel downstream of the shaping bore for laying on the frozen dairy product a continuous bead of flavoring gel. The invention also extends to a novel valve for regulating the flow of flavoring gel to the extrusion die and to a novel disposable receptacle for storage of flavoring gel.

8 Claims, 19 Drawing Sheets

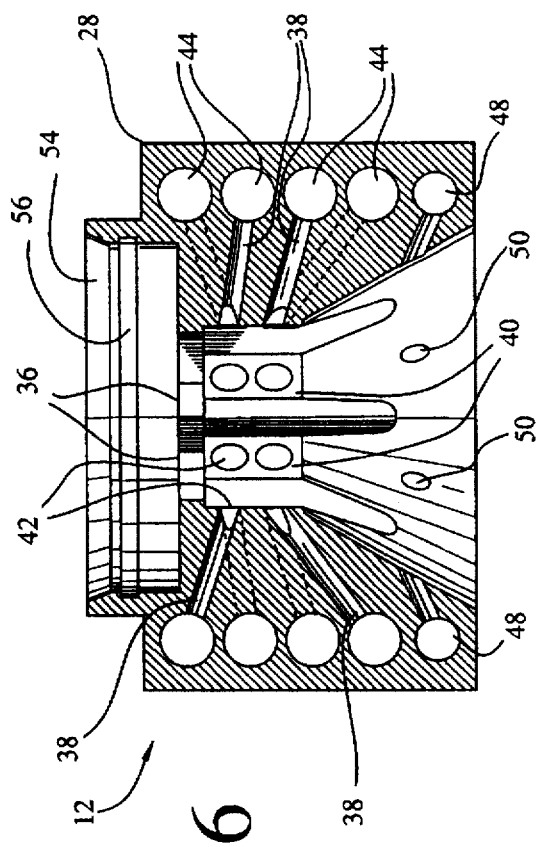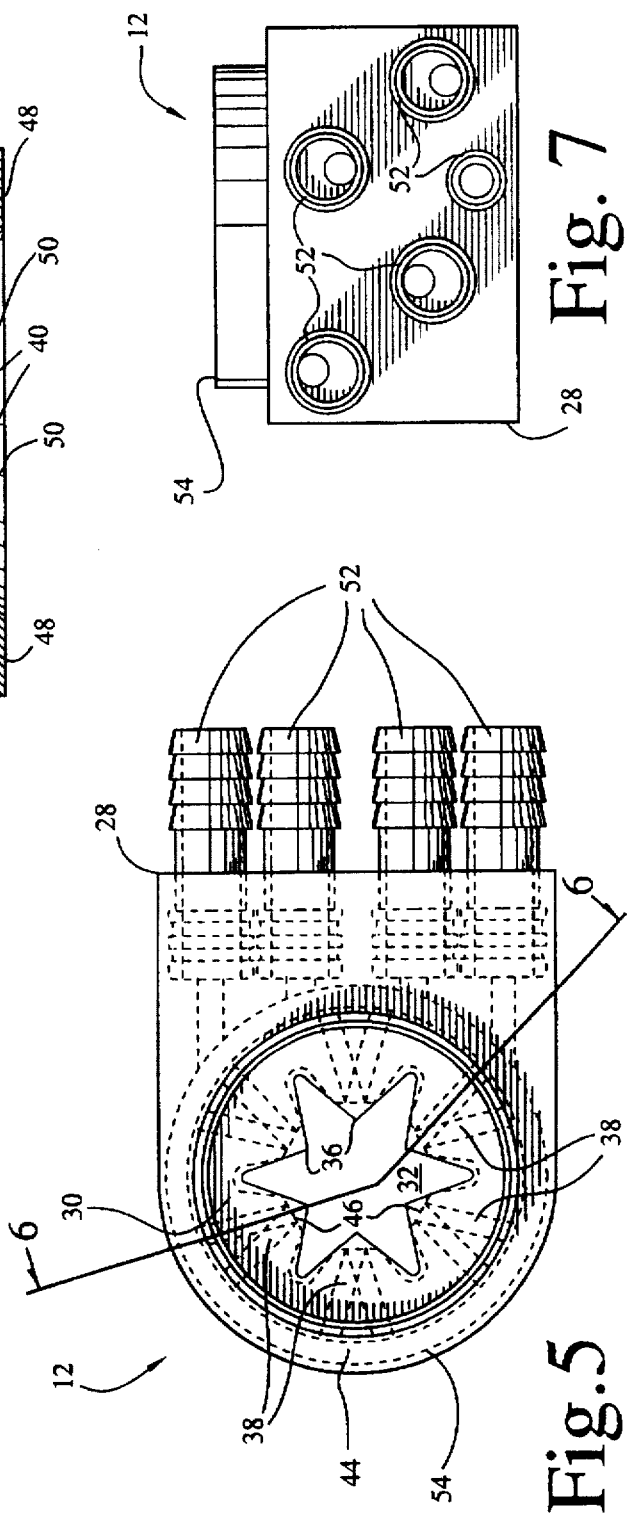

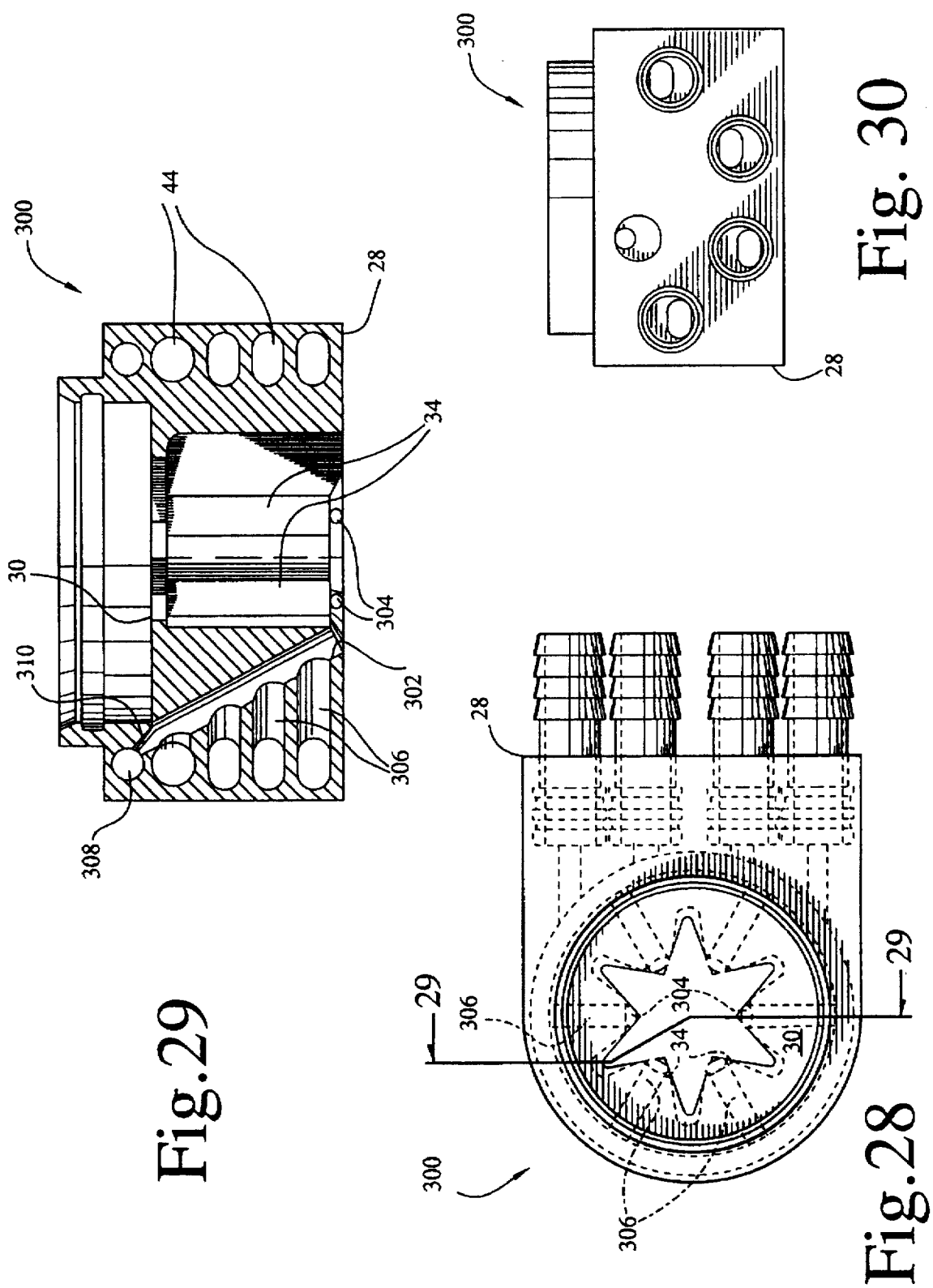

1

DEVICE FOR PRODUCING A SHAPED CONFECTION OF EDIBLE MATERIALS COMBINED INTO CO-EXTENSIVE STRIPS

This application is a continuation of application Ser. No. 08/329,612 filed Oct. 26, 1994, now abandoned, which is a continuation of application Ser. No. 08/051,015 filed Apr. 22, 1993, now abandoned, which is a continuation-in-part of application Ser. No. 07/981,334 filed Nov. 25, 1992 now abandoned.

FIELD OF THE INVENTION

The present invention relates to a device for producing a shaped confection of plastic edible materials, such as ice cream and flavouring gel combined into co-extensive strips. The invention also extends to a novel valve for regulating the flow of fluid edible material in a transfer conduit and to a disposable receptacle for storage of fluid edible material.

BACKGROUND OF THE INVENTION

Frozen dairy products such as ice cream or yogurt are commercialized for immediate consumption in individual portions served in cone-shaped receptacles of edible material. The dairy product is usually dispensed from a machine which functions according to the principle of an extrusion die. More particularly, the machine has a refrigerated chamber in which is stored at the proper conservation temperature a supply of the dairy product. A manually actuated pump draws dairy product from the refrigerated chamber and forces the dairy product to pass through a shaping bore which imparts to the dairy product a predetermined cross-sectional configuration. The cone-shaped receptacle is held by the operator of the machine below the dispensing spigot to receive the dairy product extrudate. When the desired quantity of dairy product has been delivered the machine is deactivated to terminate the dispensing cycle.

In order to enhance the appearance and taste of the dairy product, it is common practice to top the individual portion dispensed from the machine with coloured flavouring gel. The most common flavouring agents used for this purpose are concentrates intended to be applied only in small quantities to host material. Therefore, the topping of the dairy product is an operation which requires some dexterity and experience to deliver the precise amount of flavouring gel to yield an optimal taste and appearance enhancement.

Perhaps the most significant drawback of traditional methods for applying flavouring gel to frozen dairy product resides in that the gel is applied only on the top surface of the dairy product, therefore once the upper region of the individual portion has been consumed, the benefit of the flavouring gel is exhausted.

Having regard to the foregoing, it will be apparent that there is a clear need in the industry to provide an automated machine capable of delivering with accuracy the desired quantity of flavouring agent to an extrudate of a frozen dairy product.

OBJECTS AND STATEMENT OF THE INVENTION

An object of the present invention is an improved device for producing a continuous formed confection of edible materials, such as ice-cream or frozen yogurt and flavouring fluid.

Another object of the invention is a novel valve for regulating the flow of fluid edible material, such as flavouring fluid, through a transfer conduit.

2

A further object of the invention is an improved disposable receptacle for storage of fluid edible material, such as flavouring fluid.

As embodied and broadly described herein, the invention provides an extrusion die to combine plastic edible materials into a continuous formed confection having a predetermined cross-sectional shape, said extrusion die comprising:

a die body, including:

a) a shaping bore for extrusion-forming a host edible material constituting a substrate of said continuous formed confection;

b) a nozzle for discharging supplemental edible material in a pathway of the host edible material through said die body for laying a seam of supplemental edible material on the host edible material, whereby said extrusion die produces an extrudate of different edible materials combined in co-extensive strips.

It will be apparent to those skilled in the art that the invention yields surprising results and advantages. The extrusion die is very well-suited for applying flavouring fluid to frozen dairy product and overcomes the drawbacks of prior art techniques exposed in the introductory portion of the application. More particularly, the extrusion die is capable to achieve a uniform and well-controlled application of the flavouring fluid to the dairy product extrudate by precisely regulating the amount of flavouring fluid injected in the extrusion die. Furthermore, a better distribution of the flavouring fluid throughout the volume of dairy product extrudate is achieved by comparison to prior art manual topping methods which apply flavouring agent only to the top surface of the individual portion of dairy product. In addition to the above, the extrusion die in accordance with the invention greatly improves the appearance of the final product by providing a multi-coloured extrudate having a dairy product substrate complemented by one or more continuous beads of coloured flavouring fluid.

In a most preferred embodiment, the extrusion die comprises a multitude of nozzles for laying multiple beads of flavouring fluid on the dairy product extrudate flowing from the shaping bore. The nozzles are operatively associated in sets, the nozzles in a given set being in fluid communication with a common feed gallery supplying flavouring gel of a predetermined taste. This feature permits to flavour the dairy product with a fluid of desired taste by actuating the nozzles corresponding to the selected flavour.

The extrusion die comprises four nozzle sets permitting to select among four possible flavouring fluids. The nozzles are physically grouped in multi-flavour arrays circumferentially spaced apart from one another in the pathway of dairy product extrudate through the die. Each array comprises a nozzle from each set, whereby the array can be set to deliver on the extrudate flavouring fluid of selected taste. The nozzles of the arrays are grouped by pairs, each pair sharing a common discharge orifice.

Advantageously, the extrusion die in accordance with the invention includes an integrated washing system to direct jets of rinsing fluid, such as plain water, at the multi-flavour nozzle arrays for dissolving and flushing away flavouring fluid residues adhering to the discharge orifices of the nozzles. By actuating periodically the washing system, the operator of the machine can cleanly switch from one flavouring fluid to another and prevent undesirable flavour carry-over which occurs when dairy product currently dispensed by the machine is contaminated with residues of flavouring fluid utilized during a previous dispensing cycle.

As embodied and broadly described herein, the invention further provides a device for producing a continuous formed confection of frozen dairy product and flavouring fluid combined in co-extensive strips, said device comprising:

a body defining a shaping bore for extrusion-forming frozen dairy product constituting a substrate of said continuous formed confection, said body including a plurality of projections extending in said shaping bore to form longitudinal recesses on the substrate;

a channel downstream of said shaping bore relative to a direction of flow of frozen dairy product through said device, for supplementing the substrate of frozen dairy product with flavouring fluid, said channel including a plurality of nozzles for discharging flavouring fluid in longitudinal alignment with respective projections of said body, thereby said nozzles register with respective recesses on the substrate of frozen dairy product to lay therein continuous seams of flavouring fluid.

As embodied and broadly described herein, the invention provides a device to combine plastic edible materials into a continuous formed confection having a predetermined cross-sectional shape, said device comprising:

an extrusion die, including:

a) a shaping bore for extrusion-forming a host edible material constituting a substrate of said continuous formed confection;

b) a nozzle for discharging supplemental edible material in a pathway of the host edible material through said extrusion die for laying a seam of supplemental edible material on the host edible material, whereby said extrusion die produces an extrudate of different edible materials combined in co-extensive strips;

a feed system in fluid communication with said nozzle to supply supplemental edible material to said nozzle and to regulate a flow of supplemental edible material therethrough, said feed system being capable of selectively establishing a pressure differential across a discharge orifice of said nozzle constituting means to draw back in said nozzle residual supplemental edible material at said discharge orifice, whereby preventing unwanted transfer of said residual supplemental edible material to host edible material.

Most preferably, the feed system creates a momentary suction at the discharge orifices of the operating nozzles immediately after the flow of supplemental edible material, such as flavouring fluid, is interrupted to draw back in the nozzle residual flavouring fluid droplets. This feature is, particularly advantageous in the embodiment in which pairs of individual nozzles share common discharge orifices because the momentary vacuum pulse allows to clear the discharge orifice of flavouring fluid before injecting a flavouring fluid of different taste through the same discharge orifice and prevent flavour carry-over between dispensing cycles.

Advantageously, the vacuum pulse is generated by a valve located upstream of the controlled nozzles which also regulates the flow of flavouring fluid to the extrusion die. The vacuum pulse is transmitted to the discharge orifices of the nozzles through the column of fluid in the transfer conduit interconnecting the valve and the nozzles.

As embodied and broadly described herein, the invention further provides a valve for controlling a flow of fluid edible material through a conduit, said valve comprising:

a valve body, including:

a) an inlet port for admitting fluid edible material in said valve body;

b) an outlet port for discharging fluid edible material from said valve body;

c) a chamber constituting a fluid passage between said ports, said chamber including first and second adjoining cavities, said inlet port opening in said first cavity and said outlet port opening in said second cavity;

a first piston slidingly mounted in said first cavity for movement between opened and closed positions, in said opened position said first piston permitting fluid edible material to flow between said ports through said chamber, in said closed position said first piston obturating said inlet port to prevent fluid from flowing through said chambers;

a second piston slidingly mounted in said second cavity, said pistons defining therebetween a variable volume cell which communicates with said outlet port, said cell being expandable in response to movement of said pistons in respective cavities to establish a suction at said outlet port.

A valve constructed in accordance with this inventive principle is well-adapted for use in controlling the flow of flavouring fluid supplied to the extrusion die, as discussed earlier, by establishing a momentary suction when the valve is actuated toward the closed position to prevent flavour carry-over.

As embodied and broadly described herein, the invention further provides a valve for controlling a flow of fluid through a conduit, said valve comprising:

a valve body including an inlet port for admitting fluid supplied under pressure and an outlet port for discharging fluid, said ports being in a spaced apart relationships;

a closure member movable relative to said inlet port between closed and opened positions, in said closed position said closure member sealingly engaging said inlet port to prevent fluid from flowing therethrough, in said opened position said closure member being spaced apart relative said inlet port to allow fluid from flowing form said inlet port to said outlet port, pressurized fluid supplied to said inlet port acting against said closure member and urging said closure member toward either one of said positions, said closure member including a flexible membrane elastically deformable between first and second positions, said closure member being responsive to movement of said flexible membrane toward either one of said first and second position for sealingly engaging said inlet port to close said valve;

a valve control port on said valve body for admitting pressurized working fluid, said valve control port being in fluid communication with said flexible membrane, whereby ingress of pressurized working fluid in said control port causing a build-up of pressurized medium in said valve body acting against said membrane to move said membrane toward one of said first and second position, release of working fluid from said valve body causing said membrane to move toward the other of said first and second positions under the influence of pressurized fluid supplied at said inlet port and acting on said closure member.

As embodied and broadly described herein, the invention also provides a disposable receptacle for fluid edible material comprising a bag of flexible material, said bag including:

a seamless collar adjacent to an open upper end of said bag, said collar forming a tubular wrinkle free band capable of establishing a fluid-tight seal between circular mating members clamping said band therebetween;

a pair of longitudinally extending seams joining side walls of said bag at lateral extremities thereof, said seams originating below said collar and converging toward a bottom end of said bag.

Such receptacle configuration is well-suited for storing flavouring fluid to be metered to the extrusion die in accordance with the invention. More specifically, the flexible bag can be used in a pressurized vessel expelling the contents of the bag through a pick-up tube by establishing a positive pressure zone outside of the bag. The tubular and seamless collar structure of the flexible bag is an important characteristic permitting to establish a fluid-tight seal between the vessel body and a lid, clamping the bag collar therebetween. Another important feature of the flexible bag is the provision of a lower body having a tapered shape which permits to more completely drain the bag of its contents, thereby reducing waste.

As embodied and broadly described herein, the invention also provides in combination:

a disposable receptacle for fluid edible material comprising a bag of flexible material, said bag including:
   a) a seamless collar adjacent to an open upper end of said bag, said collar forming a tubular wrinkle free band capable of establishing a fluid-tight seal between circular mating members clamping said band therebetween;
   b) a pair of longitudinally extending seams joining side walls of said bag at lateral extremities thereof, said seams originating below said collar and converging toward a bottom end of said bag; and a pick-up tube for drawing edible material from said disposable receptacle, said pick-up tube comprising an elongated conduit having a closed lower end and a plurality of apertures on a side wall of said conduit for admitting edible material therein.

As embodied and broadly described herein, the invention also provides a device to combine plastic edible materials into a continuous formed confection having a predetermined cross-sectional shape, said device comprising:

a body defining a pathway for receiving therethrough an extrudate of host edible material constituting a substrate of said continuous formed confection, said body including;
   a) a nozzle for selectively discharging either one of at lest two different supplemental edible materials in said pathway to lay a seam of supplemental edible material on the host edible material, whereby forming a confection of different edible materials combined in co-extensive strips;
   b) a pair of feed conduits supplied with respective supplemental edible materials, said feed conduits being in fluid-communication with said nozzle for supplying to said nozzle supplemental edible material from either one of said feed conduits; and
   c) a washing medium supply conduit in fluid-communication with said nozzle for delivering in said nozzle washing medium in order to clean said nozzle from residual supplemental edible material, whereby preventing contamination of supplemental edible material discharged from one feed conduit with residues of supplemental edible material from the other feed conduit that remain in said nozzle.

BRIEF DESCRIPTION OF THE DRAWINGS

FIG. 5 is a top plan view at a reduced scale of the extrusion die shown in FIG. 4;

FIG. 6 is an enlarged vertical cross-sectional view taken along lines 6—6 in FIG. 5;

FIG. 7 is a rear elevational view at a reduced scale of the extrusion die shown in FIG. 4;

FIG. 28 is a bottom plan view of the extrusion die shown in FIG. 27;

FIG. 29 is a cross-sectional view taken along lines 29—29 in FIG. 28; and

FIG. 30 is rear elevational view of the extrusion die shown in FIGS. 27, 28 and 29.

DESCRIPTION OF PREFERRED EMBODIMENTS

Figure 1:
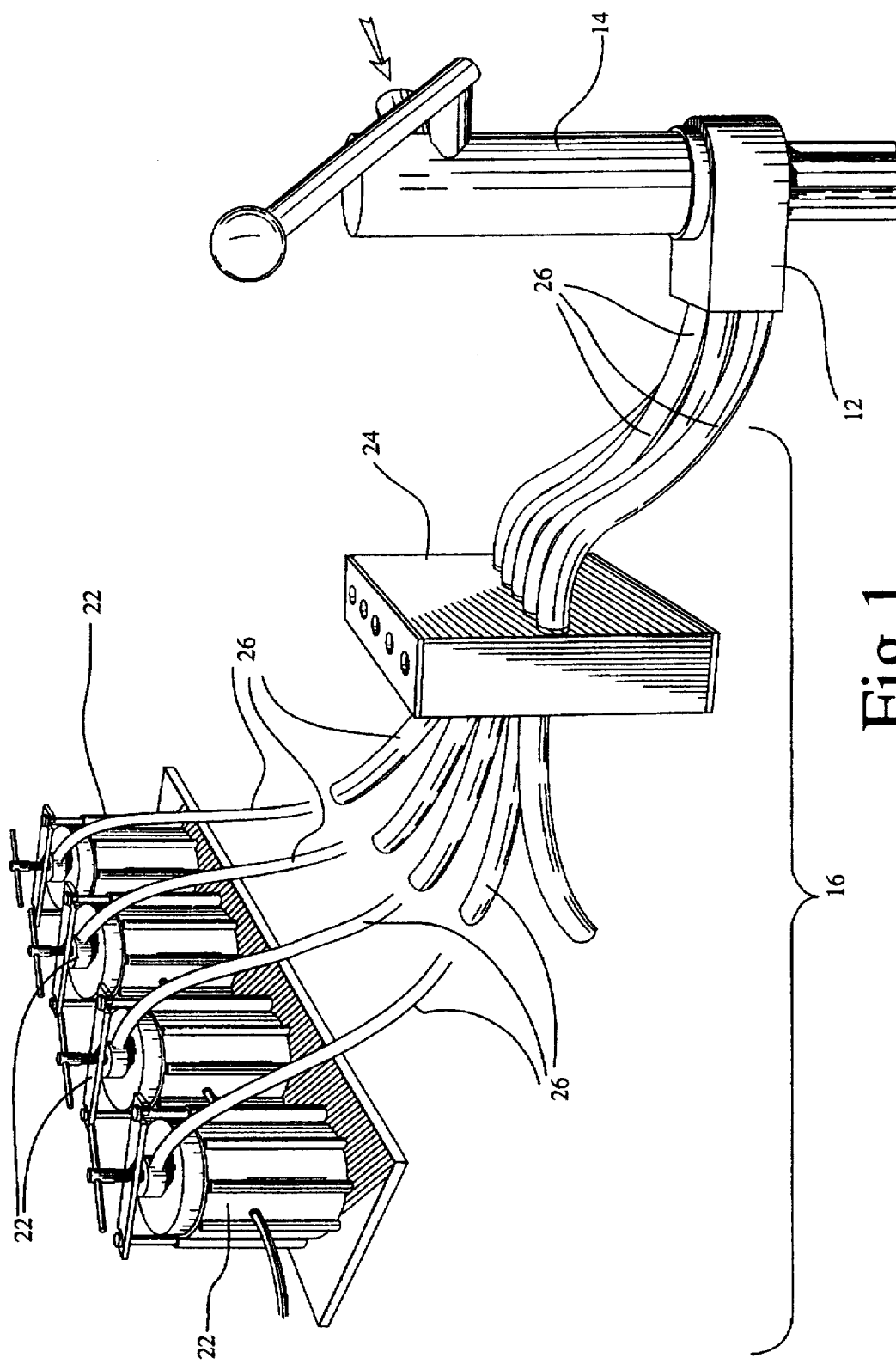
FIG. 1 is a perspective view of a device for producing a shaped confection of ice cream and flavouring fluid, in accordance with the invention, in the form of an attachment for an ice cream dispensing machine.

With reference to the annexed drawings, FIG. 1 illustrates a device, designated comprehensively by the reference numeral 10 to produce a shaped confection of ice-cream and flavouring gel combined in co-extensive strips. The device 10 is in the form of an attachment for an existing ice-cream machine and comprises a dual-stage extrusion die 12 which attaches bye suitable bracket (not shown in the drawings) to the dispensing spigot 14 of the machine, and a reed system 16 to supply flavouring gel to the extrusion die 12.

Figure 3:
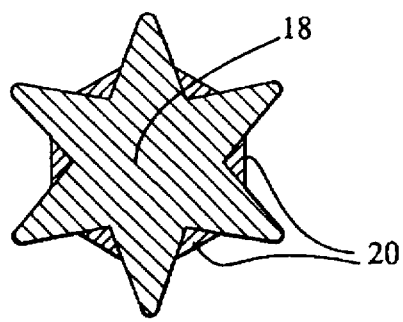
FIG. 3 is a cross-sectional view taken along lines 3—3 in FIG. 2.
Figure 2:
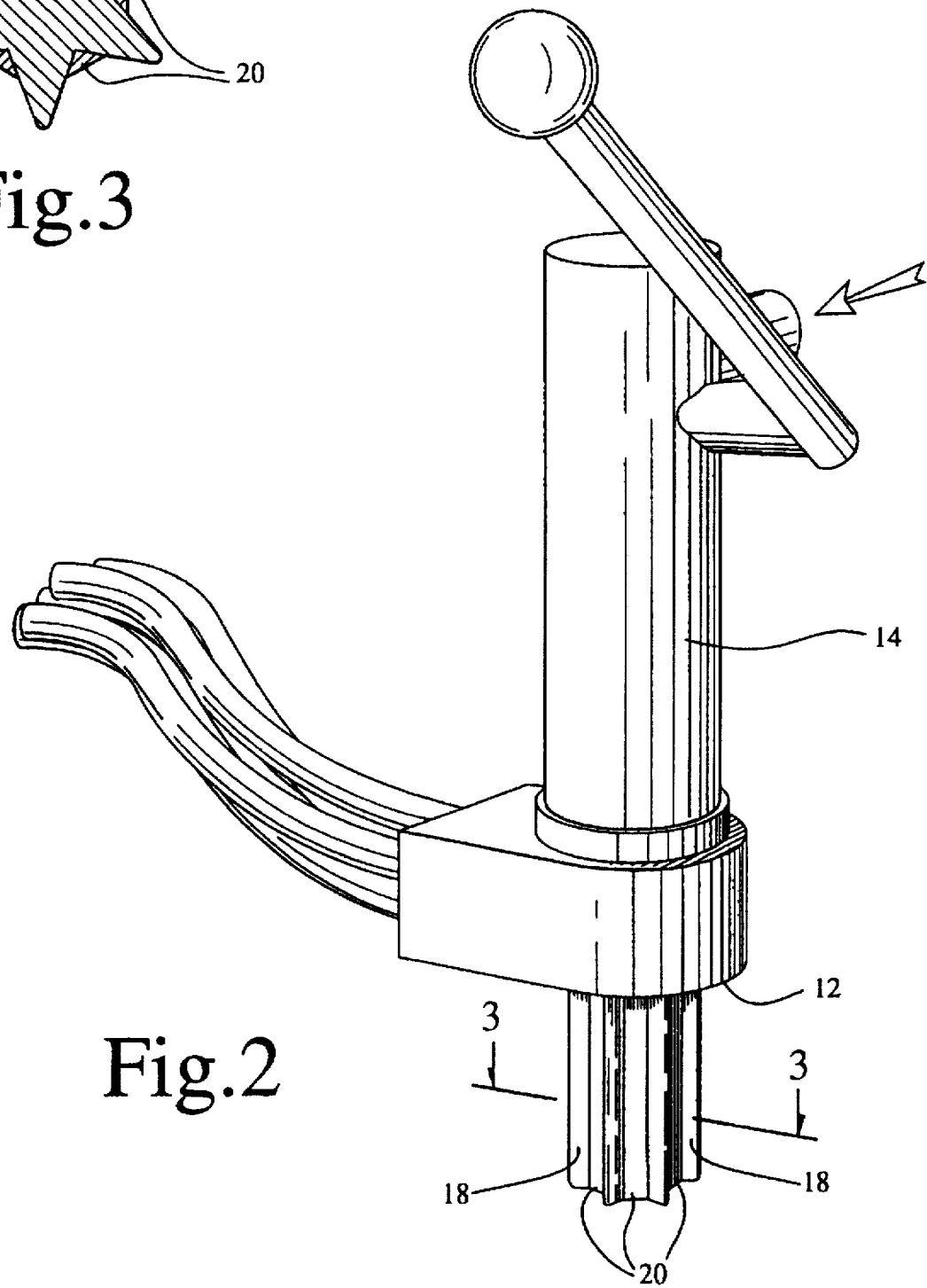
FIG. 2 is a perspective view of an extrusion die of the device shown in FIG. 1, also illustrating the shaped confection of ice-cream and flavouring gel dispensed therefrom.

FIGS. 2 and 3 illustrate in detail the shape of ice-cream confection produced by the device 10. More particularly, the confection is a continuously formed piece including a substrate 18 of ice cream which is star-shaped in cross-section. In longitudinal recesses of the substrate 12 are laid parallel and continuous beads 20 of coloured flavouring gel which enhance the taste and appearance of the substrate 18.

The purpose of the extrusion die 12 is two-fold. Firstly, the extrusion die imparts a predetermined cross-sectional shape to the ice-cream to form the substrate 18. Secondly, the extrusion die deposits on the substrate 18 the beads 20 of flavouring gel supplied from the feed system 16.

The extrusion die has the ability to selectively lay on the substrate 18 four different flavouring gels, thereby providing a choice of four different flavours. At this end, the feed system 16 is provided with independent reservoirs 22, one for each flavour to be dispensed and a multi-channel valve bank 24 for regulating the flow of flavouring gels to the extrusion die 12. Flexible conduits 26 transfer flavouring gels from the reservoirs 22 to the extrusion die 12, through the multi-channel valve bank 24. The latter has the ability to control the flow of fluid in the conduits 26, independently from one another to allow the operator of the ice-cream machine to selectively dispense one among four possible flavouring gels. It should be appreciated that the number of different flavouring gels that the device 10 can dispense is a matter of design and can be varied to suit particular applications without departing from the spirit of the invention.

The structure of the dual-stage extrusion die 12 is best shown in FIGS. 4, 5, 6 and 7. The extrusion die 12 comprises a die body 28 machined from stainless steel or any other material suitable for handling edible products, which includes a top plate 30 defining a shaping bore 32 for extrusion forming the substrate 18, and a channel 34, downstream of the shaping bore 32 to lay on the substrate 18 the longitudinal beads 20. The outline of the shaping bore 32 is selected in accordance with the desired cross-sectional shape of the substrate 18. In general, shapes imparting longitudinally extending recesses, such as star-shapes, are preferred because the recesses constitute natural channels for receiving and holding the flavouring gel.

Figure 4:
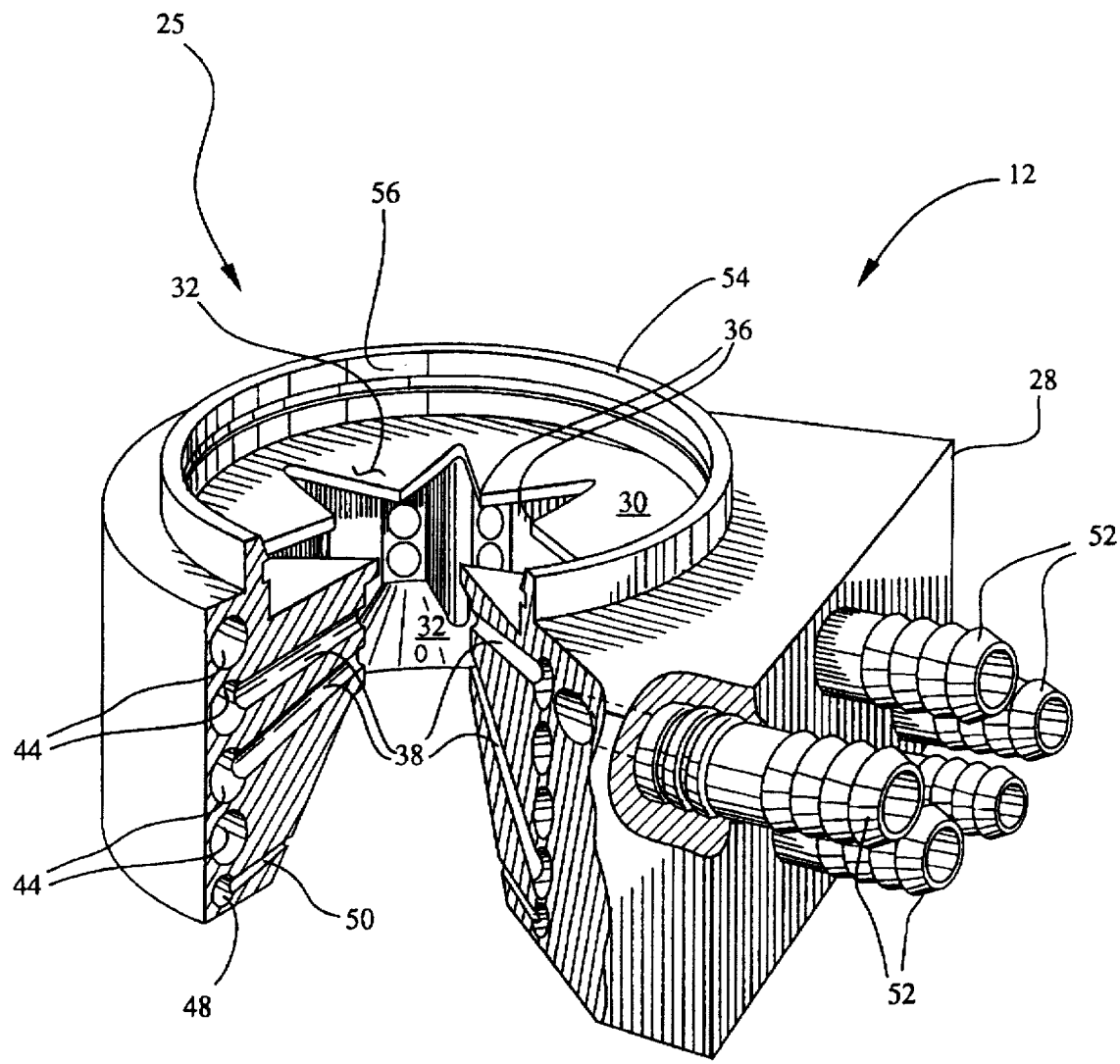
FIG. 4 is an enlarged, perspective, partly sectional view of the extrusion die.

In the example shown in FIGS. 4 and 5, the shaping bore 32 has the outline of a six-point star which is achieved by cutting the plate 30 to form a series of projections 36 surrounding the centerline of the shaping bore 32.

Figure 6A:
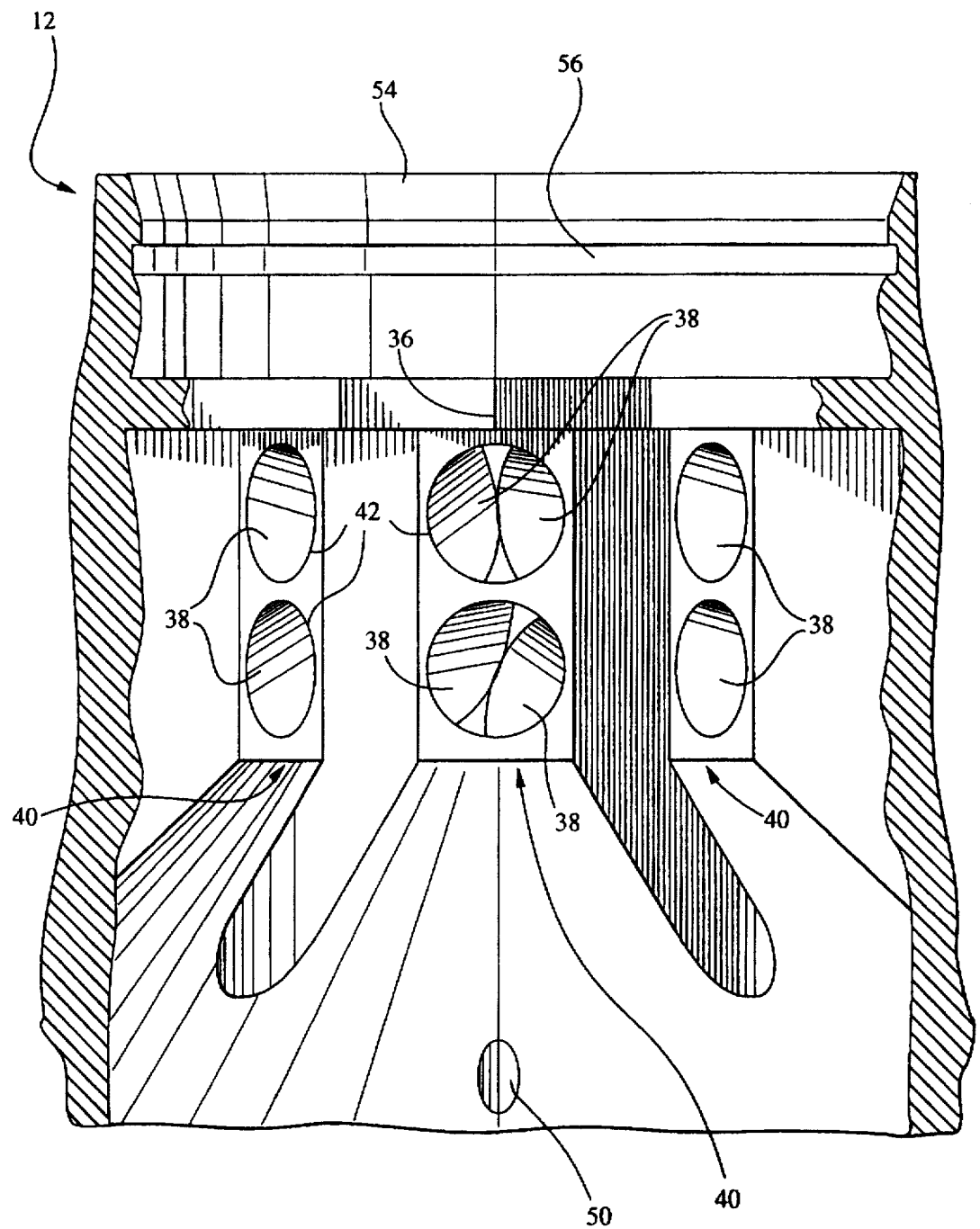
FIG. 6a is a further enlarged fragmentary cross-sectional view of the extrusion die.
Figure 8:
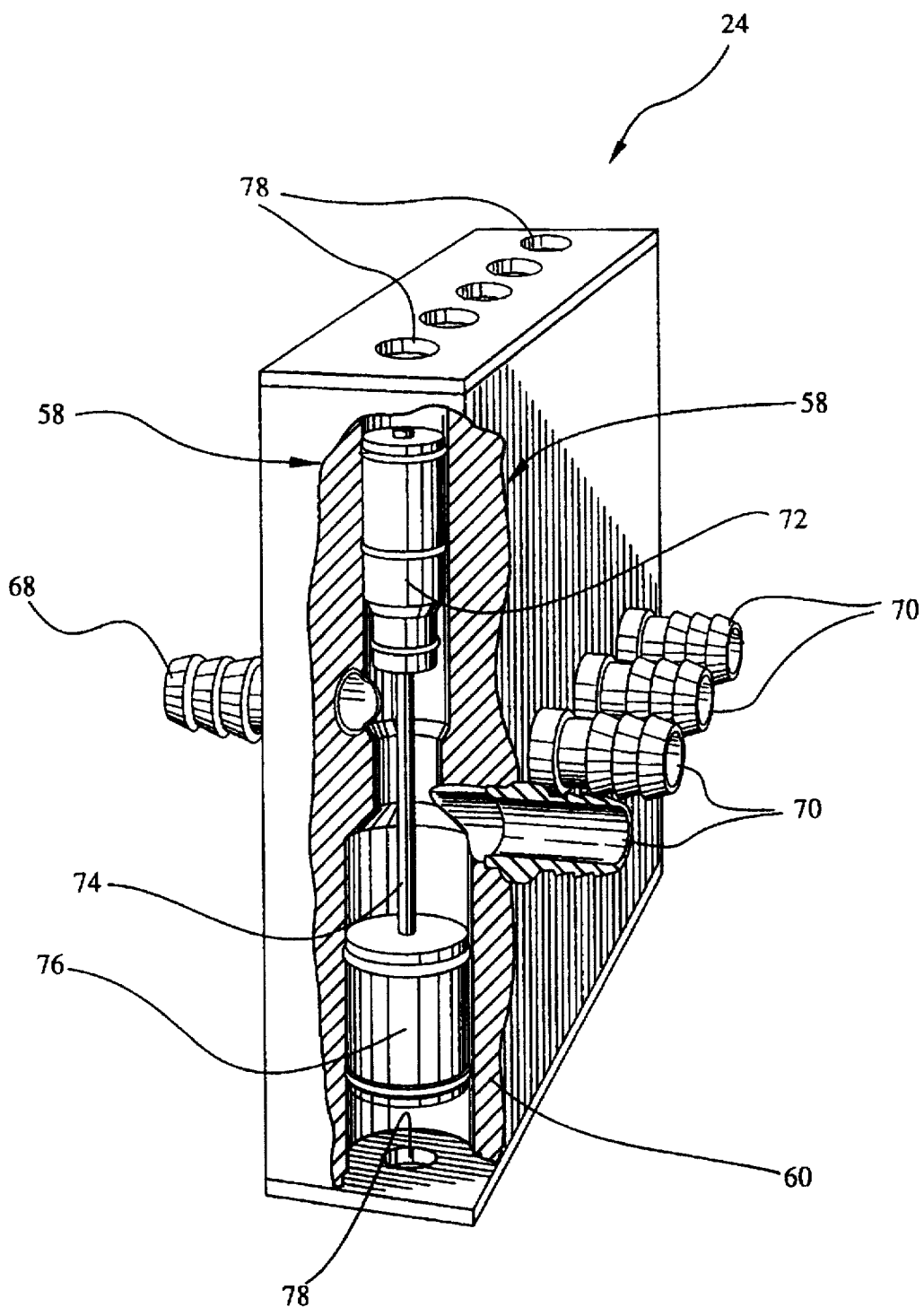
FIG. 8 is a perspective, partly sectional view of a five channel valve bank for controlling the flow of flavouring fluid to the extrusion die or the device shown in FIG. 1.

The channel 34 includes a plurality of nozzles 38, opening in the channel 34, to lay on corresponding longitudinal sectors of the substrate 18 beads of flavouring gel. The nozzles 38 are grouped in arrays 40 of four nozzles each, the arrays being equidistantly spaced apart from one another and disposed around the centerline of the channel 34. The nozzles 38 of each array 40 are grouped by pairs sharing a single discharge orifice. This feature is best shown in FIG. 6. Each pair of nozzles 38 merge into a common discharge orifice 42, whereby the orifice channels two different flavouring gels. This arrangement provides arrays 40 which are very compact due to the lesser number of discharge orifices 42 required comparatively to an arrangement in which each nozzle 38 has a dedicated discharge orifice, permitting to align the discharge orifices 42 of a given array 40 along the centerline of channel 34 in order to deposit the flavouring gel directly at the bottom of the corresponding longitudinal recess of the substrate 18.

Circular feed galleries 44, surrounding the channel 34, connect with the nozzles 38 to supply thereto flavouring gel. Each feed gallery 44 dispenses a specific flavouring fluid which is supplied from a corresponding reservoir 22 through the valve bank 24 and is distributed to one nozzle 38 of each array 40. The special arrangement of the nozzles 38 associated with a given feed gallery 44 is best illustrated in FIG. 5. The nozzles 38 originate at spaced apart locations on the feed gallery 44 and extend radially inwardly toward the channel 34. This structure provides a three-dimensional conduit network of vertically stacked and concentric feed galleries and individual nozzles 38 connecting with the respectively feed gallery 44 to channel flavouring gel toward a discharge orifice 42.

The arrays 40 are in longitudinal alignment with respective projections 36 that form the longitudinal recesses of the substrate 18. The reason for such geometrical relationship is to deposit the flavouring gel precisely in the recesses of the substrate 18, as discussed earlier. The apex 46 of each array 40 on which open the discharge orifices 42 is recessed relative to the apex of the corresponding projection 36, as best shown in FIG. 5. This recess provides a gap between the bottom of the longitudinal recesses on the substrate 18 and the discharge orifices 42 to accommodate the volume of flavouring gel discharged to form the beads 20.

With reference to FIG. 6, the extrusion die 12 further comprises an integrated washing system to dissolve and flush away residues of flavouring gel and ice-cream adhering to the internal walls of the channel 34. The washing system comprises a water feed gallery 48 concentric with the feed galleries 44, supplying water to individual orifices 50 generating water streams which are directed toward respective nozzle arrays 40. The water streams emerging from the orifices 50 are intended to produce an impact of fluid particles against the area surrounding the discharge orifices 42 to more efficiently remove deposits of flavouring gel susceptible to accumulate in that region.

The feed galleries 44 and 48 are in fluid communication with respective nipples 52 having a serrated outer surface for receiving the flexible conduits 26 which furnish the various flavouring gels and rinsing water to the extrusion die 12.

On the top surface of the die body 18, immediately above the plate 30 is formed a metallic projecting ring 54 concentric with the shaping bore 32 and with the channel 34, for mating the extrusion die 12 to the discharge spigot 14 of the ice-cream machine. An O-ring seal 56 is mounted in the ring 54 to establish a fluid-tight seal with the outer surface of the discharge spigot 14. It will be appreciated that the diameter of the ring 54 and the dimensions of the O-ring seal 56 will vary to fit the particular model of ice-cream machine to which the device 10 is installed.

To prevent the extrusion die 12 from accidentally becoming detached from the spigot 14 under the effect of ice-dream pressure exerted against the plate 30, a suitable mounting bracket should be used to fasten the extrusion die 12 to the spigot 14 or to any suitable bearing part of the ice-cream machine. Again, the mounting hardware of the extrusion die 12 is subject to variations in accordance with the model of ice-cream machine receiving the device.

A variant of the extrusion die, designated by the reference numeral 300 is shown in FIGS. 27 to 30 of the annexed drawings. To avoid unnecessary duplication, components of the extrusion die 300 that are the same or very similar to those of the extrusion die 12 will be designated by the same reference numerals.

The extrusion die 300 has a reconfigured internal conduit network for the distribution of flavouring gel, that provides a reduced number of discharge nozzles for laying the strips of flavouring gel on the substrate 18. More specifically, the discharge nozzles, designated by the reference numeral 302 are in the form of elongated passageways converging toward the discharge end of the channel 34 and forming respective discharge orifices 304 located at the very end of the channel 34. The number of discharge nozzles provided in the die body 28 depends on the desired number of flavouring gel beads to be deposited on the substrate 18. As in the previous embodiment, the geometrical relationship between the discharge orifices 304 and the plate 30 is such as to establish a vertical alignment between the projections 36 and the respective discharge orifices 304 so as to lay the flavouring gel in the longitudinal recesses of the substrate 18.

Each discharge nozzle 302 communicates with every feed gallery 44 through a conduit 306. The conduits 306 open at different longitudinal positions in the nozzles 302, and extend radially outwardly to reach the respective feed galleries 44.

Near the upper end of the die body 28 is formed a washing medium feed gallery 308 that communicates with the discharge nozzles 302 through channels 310. The location of the washing medium feed gallery 308 relative the flavouring gel feed galleries is important for achieving a thorough cleansing of the discharge nozzles 302. By discharging washing medium upstream of every conduit 306, each nozzle 302 is completely purged of flavouring gel, no matter which feed gallery 44 had been supplying the nozzle.

Aerated tap water has been found to be a particularly effective washing medium. By charging water with compressed gas, such as air, an effervescent fluid is formed which contains a comparatively small amount of water, yet it can efficiently dislodge and carry away flavouring gel residues. It is preferable to use as little water as possible during the cleansing cycle in order to reduce undesirable dripping from the discharge orifices 302 when the flow of washing medium is terminated.

Figure 9:
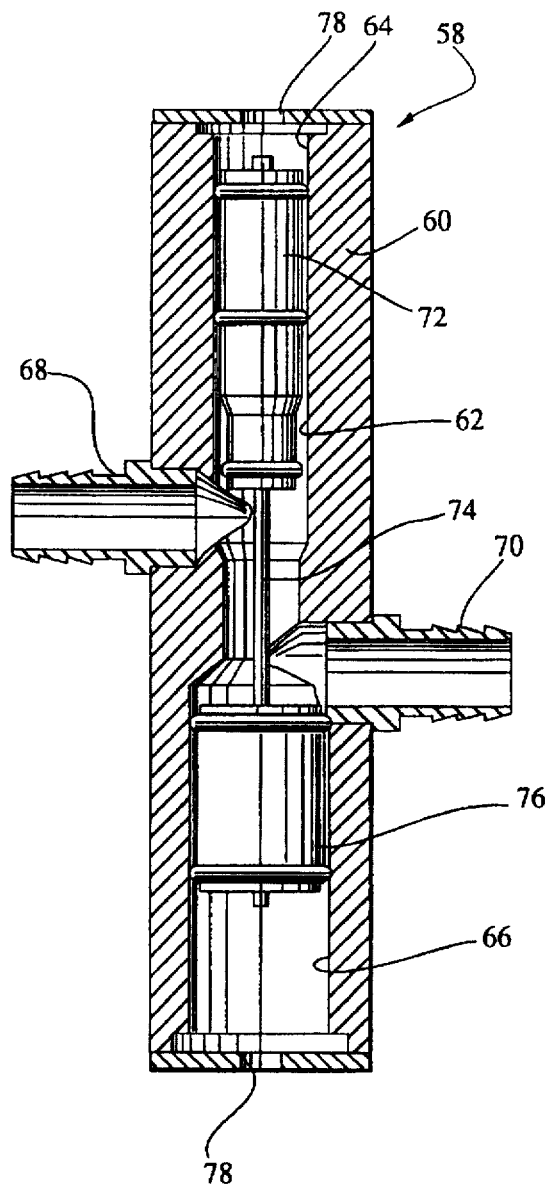
FIG. 9 is a vertical cross-sectional view of a valve unit of the valve bank illustrated in FIG. 8, in the fully opened position.

The structure and operation of the multi-channel valve bank 24 will now be described with reference to FIGS. 8 to 12. The valve bank 24 is comprised of five independent valve units 58 for independently regulating the flow of flavouring gel and rinsing water to the respective feed galleries 44 and 48 of the die body 28. The structure of a valve unit 58 is best shown in FIG. 9. A valve body 60 defines an internal chamber 62 including adjoining cylindrical cavities 64 and 66 having different transverse dimensions. More particularly, the lower cavity 66 has a larger diameter than the upper cavity 64. Art inlet port 68 opens in the upper cavity 64 while an outlet port 70 opens in the lower cavity 66.

A piston 72 slidingly mounted in the cavity 64 regulates the flow of fluid incoming from the inlet port 68. In the position shown in FIG. 9, the piston 72 fully clears the discharge orifice of the inlet port 68, allowing fluid to freely flow between the inlet port 68 and the outlet port 70.

A rod 74 projecting from the piston 72 extends up to a secondary piston 76 slidingly mounted in the lower cavity 66. The purpose of the rod 74 is to maintain the pistons 72 and 76 at a predetermined distance from one another.

The valve unit 58 is pneumatically actuated and at this end the cavities 64 and 66 include at their extremities ports 78 for admitting compressed air.

Figure 10:
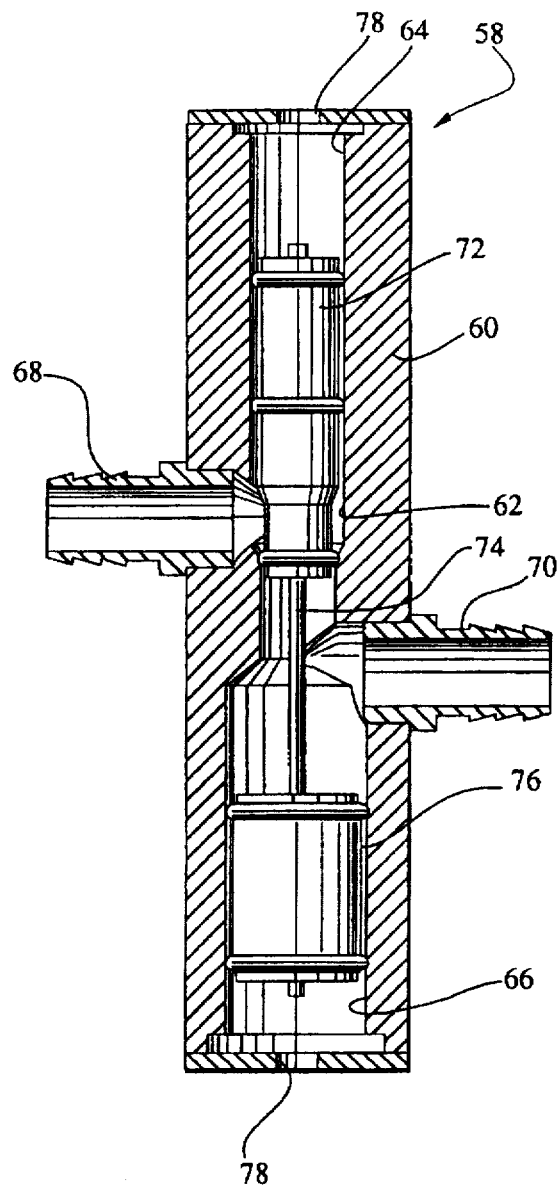
FIG. 10 is a vertical cross-sectional view of the valve unit shown in FIG. 9, illustrating the valve unit actuated toward the closed position.
Figure 11:
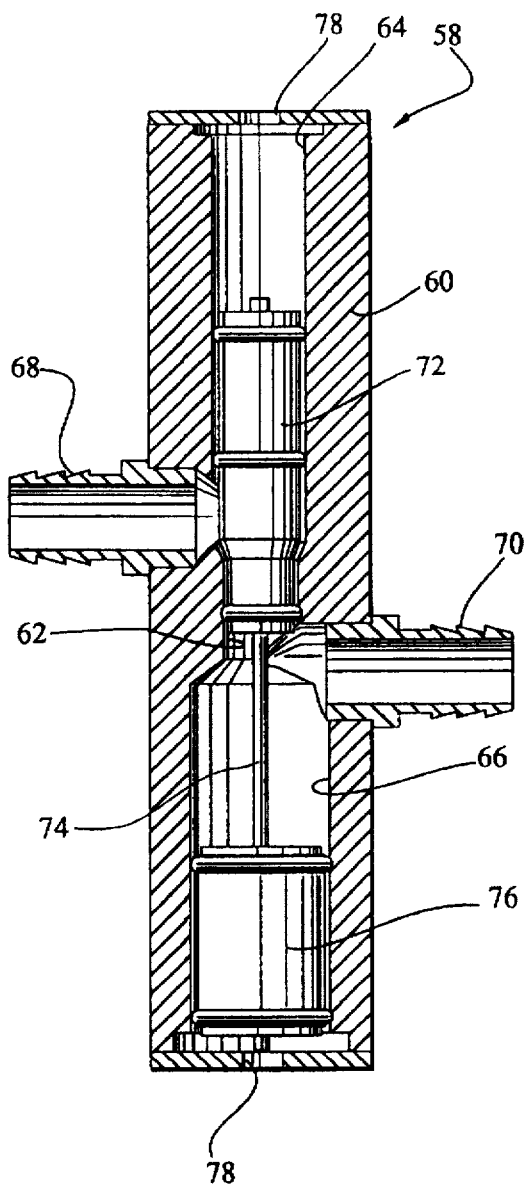
FIG. 11 is a vertical cross-sectional view of the valve unit shown in FIG. 9, illustrating the valve unit in the fully closed position.

The valve unit 58 operates as follows. Air pressure is continuously supplied from an appropriate source (not shown in the drawings) to the cavity 64, while compressed air is admitted to the cavity 66 through a suitable valve (not shown in the drawings) to selectively build-up air pressure behind the piston 76 in order to cause the desired displacement of the pistons 72 and 76. When the cavity 66 is at atmospheric pressure, compressed air in the cavity 64 will cause the piston 72 to descend, as shown in FIG. 10. In turn, the rod 74 pushes the piston 76 down to maintain a constant inter-piston distance. Due to the fact that the lower cavity 66 has a larger transverse dimension, the piston 76 displaces a larger volume comparatively to the piston 72, for the same longitudinal travel. Accordingly, the downward movement of the pistons 72 and 76 will expand the volume of the cell bound by the pistons 72 and 76 and the walls of the chamber 62, which translates into suction manifesting itself at the inlet port 68 and at the outlet port 70. When the piston 72 reaches the inlet port 68 to obturate its discharge orifice, as shown in FIG. 10, suction will exist only at the outlet port 70, causing a momentary back flow of fluid in the conduit connecting the valve unit 58 to the respective nozzles 38. This momentary back flow creates a pressure differential at the discharge orifices 42 drawing residual flavouring gel back in the respective nozzles 38, to clear the discharge orifices 42 and reduce the incidence of flavour carry-over between dispensing cycles. The suction will cease when the piston 76 reaches the bottom of the cavity 66, as shown in FIG. 11.

When compressed air is admitted in the cavity 66, the piston 76 raises the piston 72 through the intermediary of the rod 74, against pressurized air in the upper cavity 64. The pistons 72 and 76 travel upwardly in spite of equal air pressure in the cavities 64 and 66 due to the fact that the lower piston 76 has a larger surface area and therefore generates a higher force than the piston 72.

Figure 12:
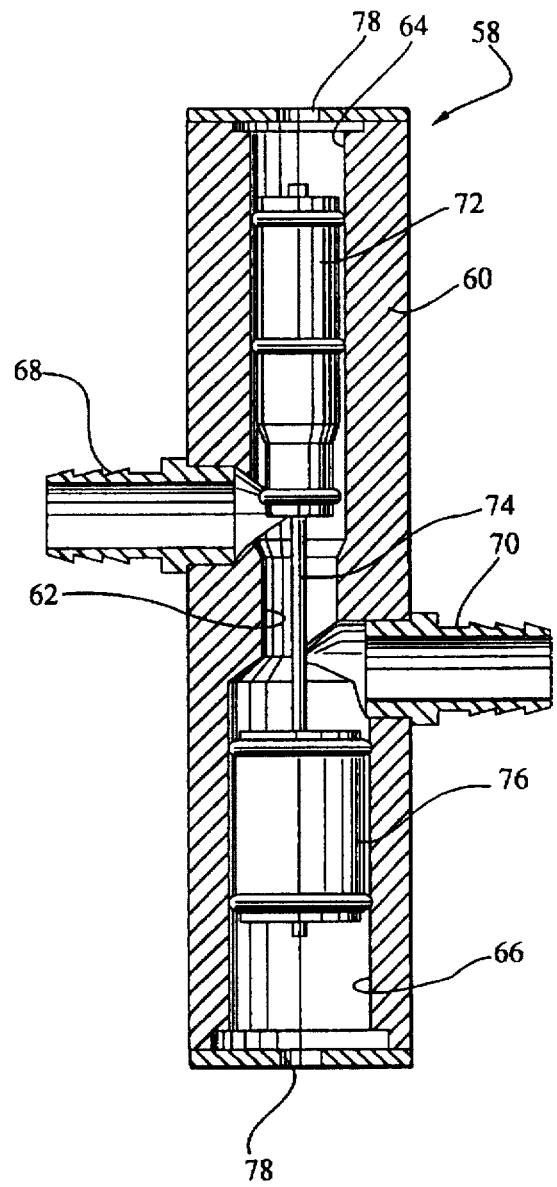
FIG. 12 is a vertical cross-sectional view of the valve unit shown in FIG. 9, illustrating the valve unit actuated toward the opened position.
Figure 13:
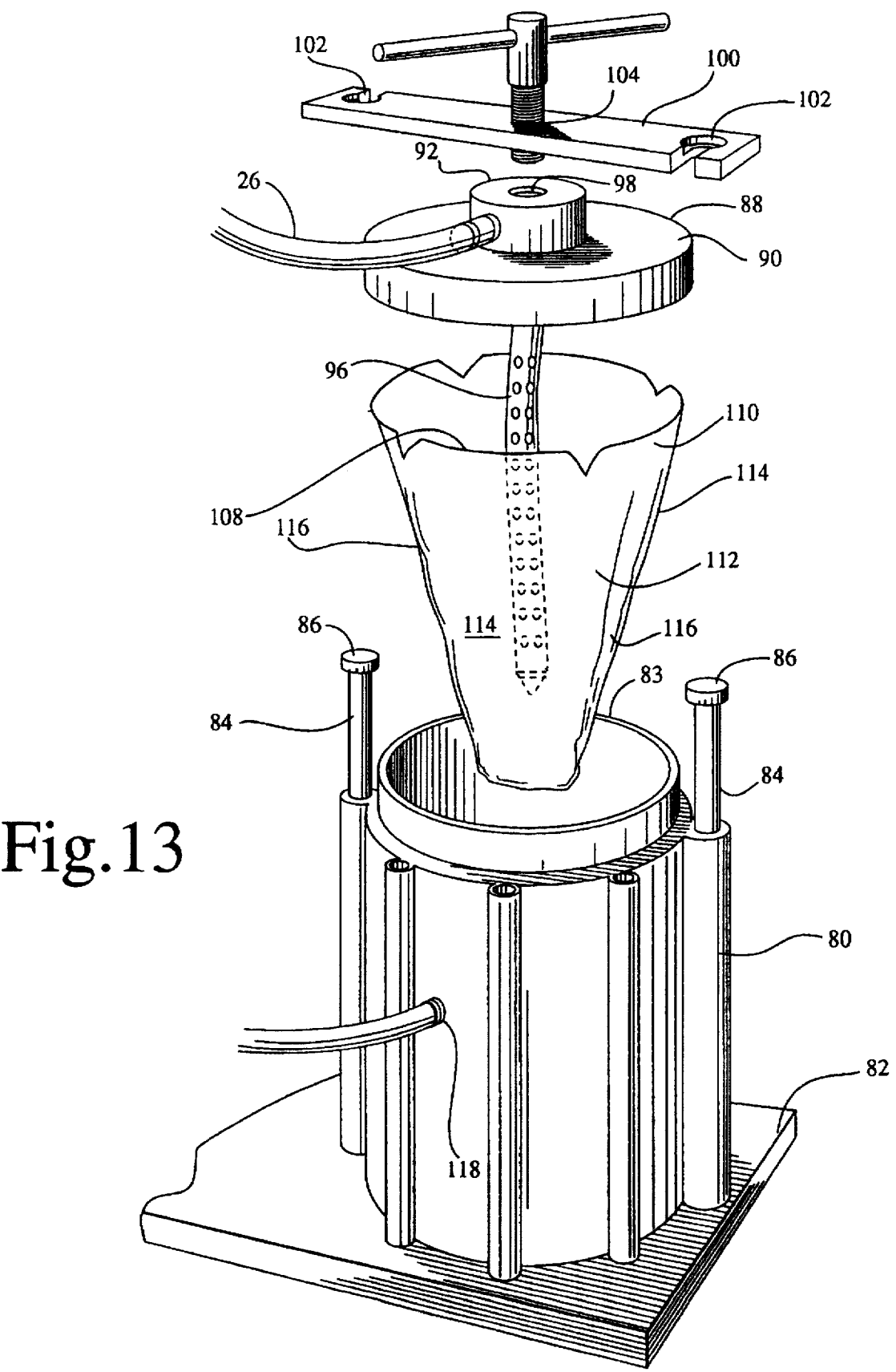
FIG. 13 is a perspective exploded view of an assembly for supplying flavouring fluid to the extrusion die shown in FIG. 4.
Figure 14:
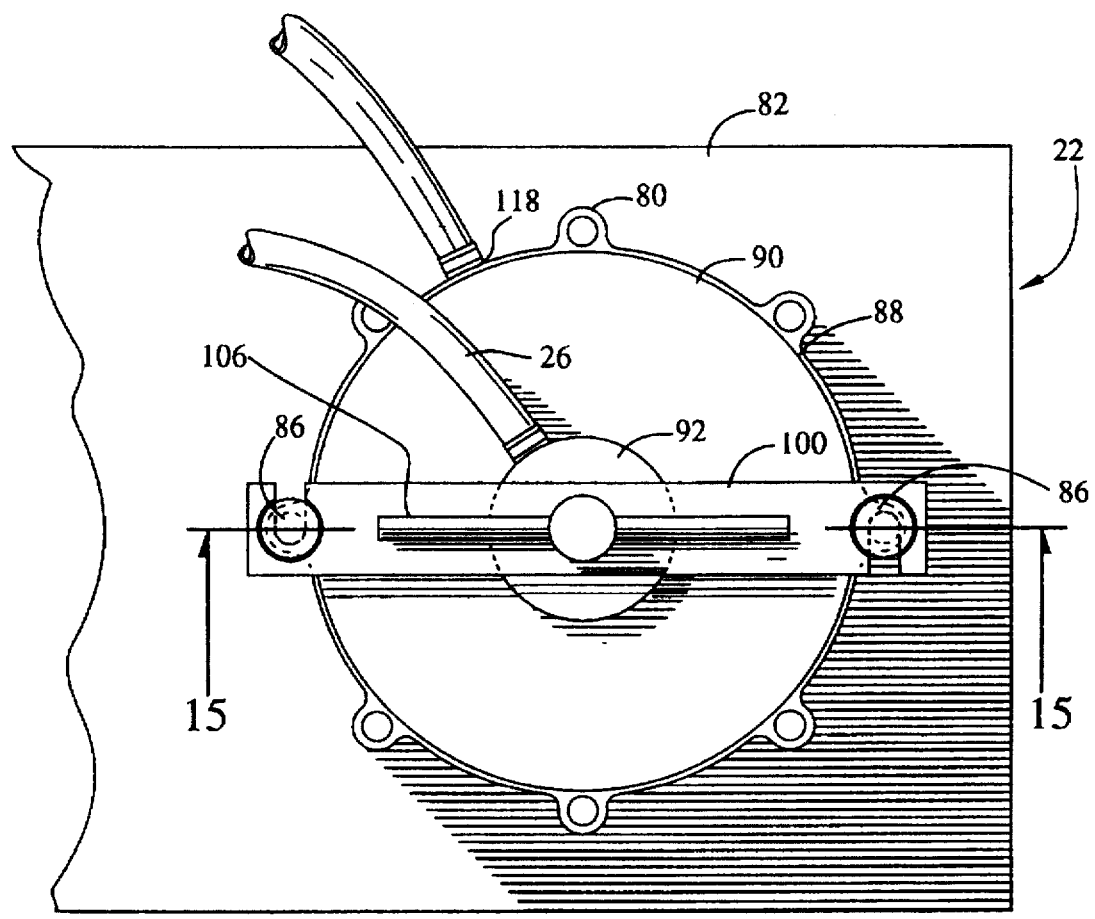
FIG. 14 is a top plan view of the assembly shown in FIG. 13.

FIG. 12 illustrates the valve unit 58 actuated toward the opened position to allow flavouring gel to flow through the valve.

The valve bank 24 includes five valve units 58, four of them controlling the flow of flavouring gels from the reservoirs 22 and one to regulate the flow of rinsing water supplied to the feed gallery 48. To achieve a more compact arrangement, the valve units 58 are inverted one relative the other, in other words the piston 72 of one valve unit faces the piston 76 of the adjacent valve unit.

FIGS. 19 to 23 illustrate a four channel valve bank, in accordance with a variant, for controlling the flow of flavouring fluid to the extrusion die 12. The valve bank, designated comprehensively by the reference numeral 200 comprises four valve units 202 which are identical to one another and share a common valve body 204. The valve body 204 comprises a top surface on which open the inlet ports 206 and the outlet ports 208 of each valve unit 202. These ports are in the form of a plurality of independent apertures communicating with respective serrated nipples for receiving the inlet and the outlet conduits 26.

On the surface 205 is mounted a flexible membrane 210 made of rubber-like material. The peripheral portion of the membrane 210 is clamped against the surface 205 by a cover 212 which is secured to the valve body 204 by bolts 214. On the surface of the cover 212 which faces the membrane 205 are formed four oval recesses 216, one for each valve unit 202. Each recess 216 has such an extent so as to encompass the respective inlet port 206 and outlet port 208. In each recess 216 opens a control port 218 for admitting therein compressed air. The recesses 216 are separated from one another by land areas 220 which positively clamp the portions of the membrane 210 co-extensive therewith against the surface 205.

The valve bank 200 operates as follows. When the recess 216 of a selected valve unit 202 is at atmospheric pressure, pressurized flavouring gel admitted through the inlet port 206 deforms the membrane 210 upwardly in the recess 216, thereby allowing flavouring fluid to flow over the surface 205 and reach the outlet port 208. Cross-flow between independent valve units 202 is precluded by virtue of the seal formed by the land areas 220 pressing on the membrane 210. To close the valve unit 202, compressed air, at a pressure exceeding the pressure of the flavouring gel supplied at the inlet port 206 is admitted to the control port 218 in order to establish in the recessed area 216 a high pressure zone. As a result, membrane 210 is forced in sealing contact with the surface 205, against the pressure exerted by the flavouring gel, to obturate the inlet port 206 and the outlet port 208. The valve is caused to assume the opened condition by venting the recessed area 216.

The valve bank 200 has been found satisfactory for use in controlling the flow of flavouring fluid to the extrusion die. Objectively, such valve construction is not very practical for controlling the flow of water to the washing system of the extrusion die 12, since the water is supplied from a tap where continuous pressure exists which would require the continuous application of compressed air in order to maintain the valve closed even when the extrusion die 12 is not being used. Such difficulty is avoided with the flavouring fluid which would normally be supplied to the valve units by a dispensing device that can be deactivated simultaneously with the air compressor supplying the working fluid to the control ports of the valve bank. Accordingly, when the air compressor is turned off, simultaneously the pressure of flavouring fluid at the inlet ports of the independent valve units falls, thereby precluding flow of flavouring fluid through the valve units.

Figure 24:
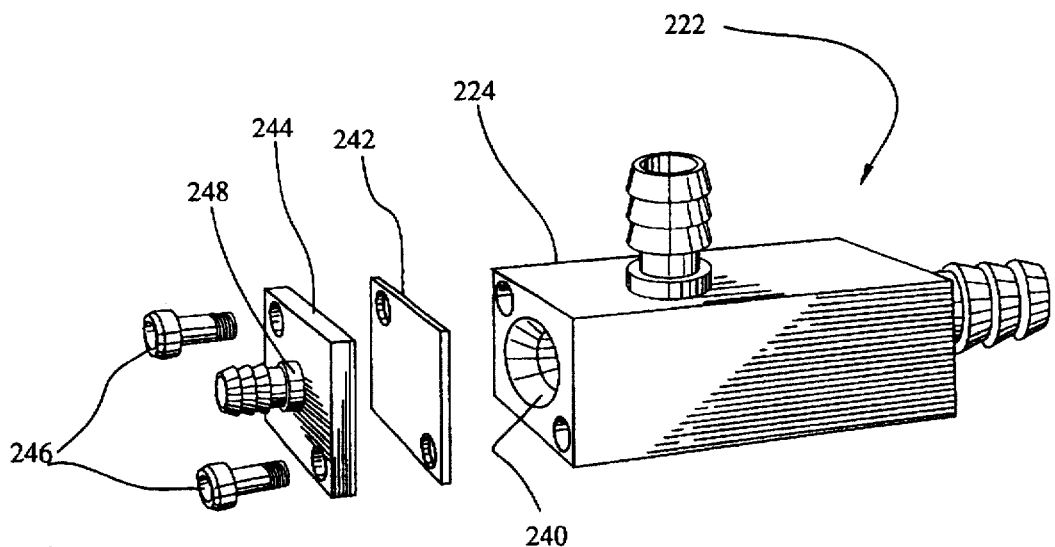
FIG. 24 is an exploded view of a valve for controlling the flow of rinsing fluid to the extrusion die of the device shown in FIG. 1, according to a second variant.
Figure 25:
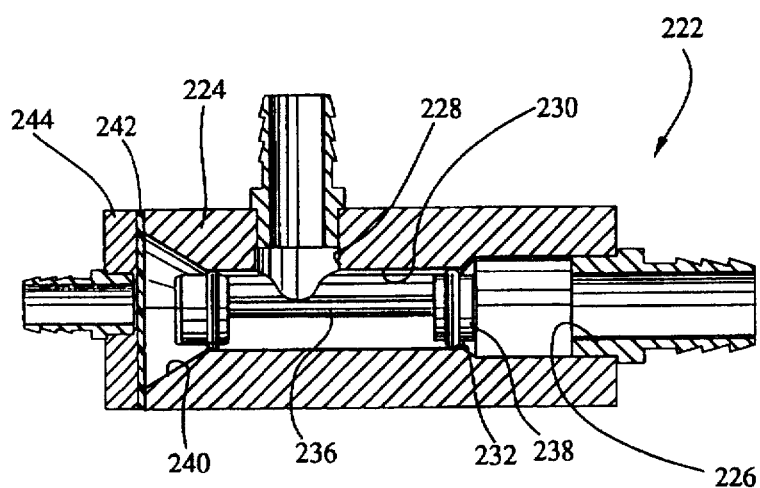
FIG. 25 is a vertical cross-sectional view of the valve depicted in FIG. 24, showing the valve in the closed position.
Figure 26:
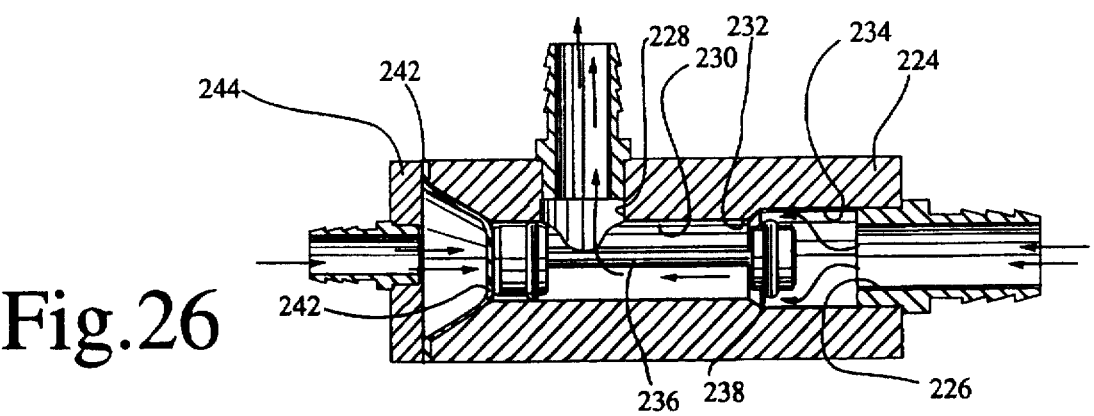
FIG. 26 is a vertical cross-sectional view of the valve depicted in FIG. 24, showing the valve in the opened position.
Figure 27:
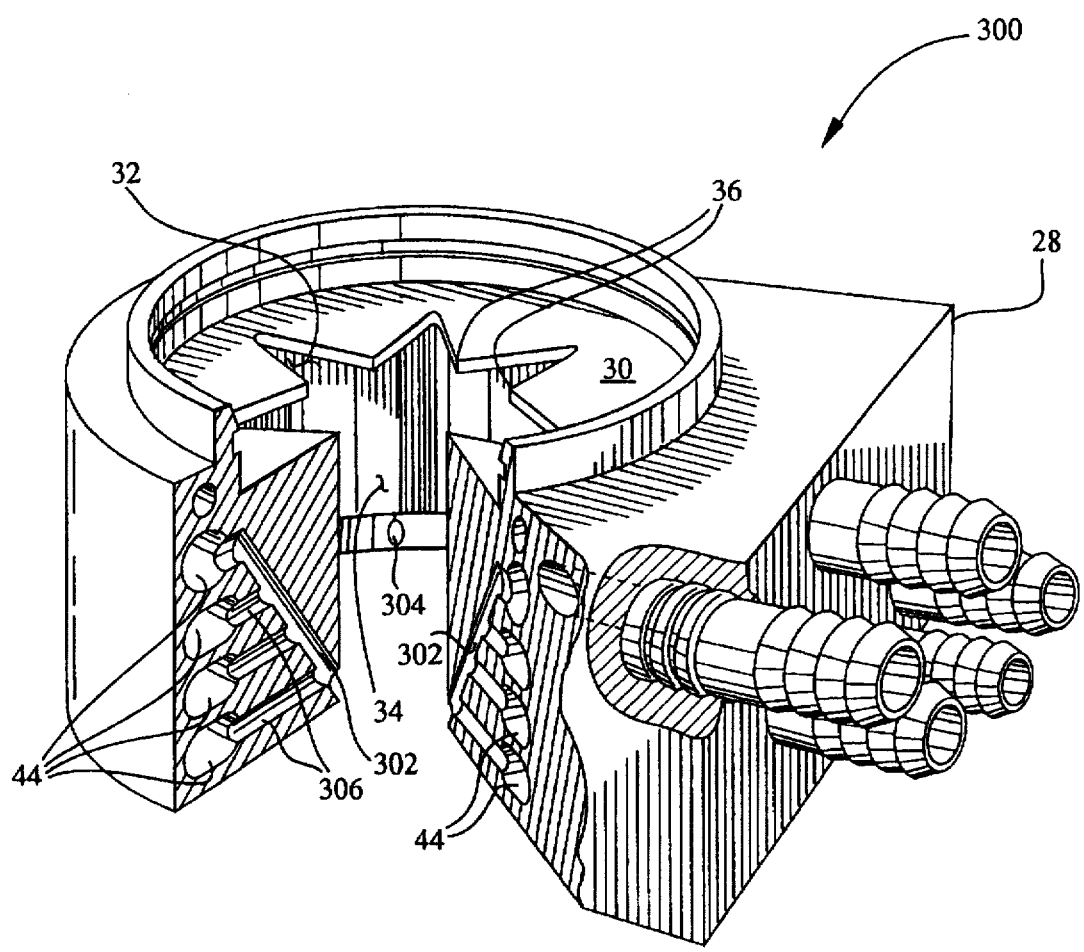
FIG. 27 is a perspective view, partly sectional of an extrusion die in accordance with a variant.

A valve unit which is suitable for controlling the flow of water to the rinsing system of the extrusion die 12 is shown in FIGS. 24 to 26. The valve, identified comprehensively by the reference numeral 222, comprises a valve body 224 including an inlet port 226 and an outlet poet 228 communicating through an internal channel 230 having a generally circular cross-sectional shape. The inlet port 226 has a stepped configuration including a sealing section 232 followed by an enlarged section 234. A piston 236 slidingly mounted in the channel 230 comprises a sealing head 238 which reciprocates in the inlet port 226. More specifically, when the sealing head 238 engages the section 232 of the inlet port, the later is completely obturated, as shown in FIG. 25. When the piston 236 moves to locate the sealing head 238 in the section 234 of the inlet port, fluid is allowed to pass between the inner walls of the inlet port 226 and the sealing head 238.

Opposite the inlet port 226, the valve body 224 comprises a deep conical recess 240 from which projects the piston 236. A flexible membrane 242 overlying the recess 240 is clamped against the valve body 224 by a cover 244. The cover is secured to the valve body 224 by screws 246. A control port 248 opens in the recess 240 through the cover 244 in order to admit compressed air against the membrane 242.

In the position shown in FIG. 25, no pressure acts against the membrane 242. As a result, the water pressure at the inlet port 226 forces the piston 236 to seal the port and close the valve. By applying compressed air at the control port 248 the membrane is deformed and bulges within the recess 240. As a result, the piston 236 is displaced along a direction countercurrent to the direction of flow of water through the inlet port 226, to locate the sealing head 238 at the section 234, thereby opening the valve. This is best shown in FIG. 26. By venting the air pressure acting on the membrane 242, the water pressure displaces the piston along a direction concurrent to the water flow to effect closure of the valve.

It will be appreciated that such valve configuration can be conveniently used to control the flow of water to the extrusion die 12 since it is maintained closed in absence of air pressure. Accordingly, when the air compressor controlling the valve is deactivated, the valve automatically assumes the closed condition to shut-off the water flow.

The structure and operation of a reservoir 22 for storage of flavouring gel will now be described with relation to FIGS. 13 to 18. The reservoir 22 comprises a pressure vessel including a cup-shaped body 80 of metallic material such as aluminum secured to a suitable base 82. The cup-shaped body includes a circular projecting neck 83 for receiving a lid to close the pressure vessel as it will be described in detail hereinafter. From the cup-shaped body 80 project upwardly a pair of locking pins 84 having enlarged heads 86.

Figure 15:
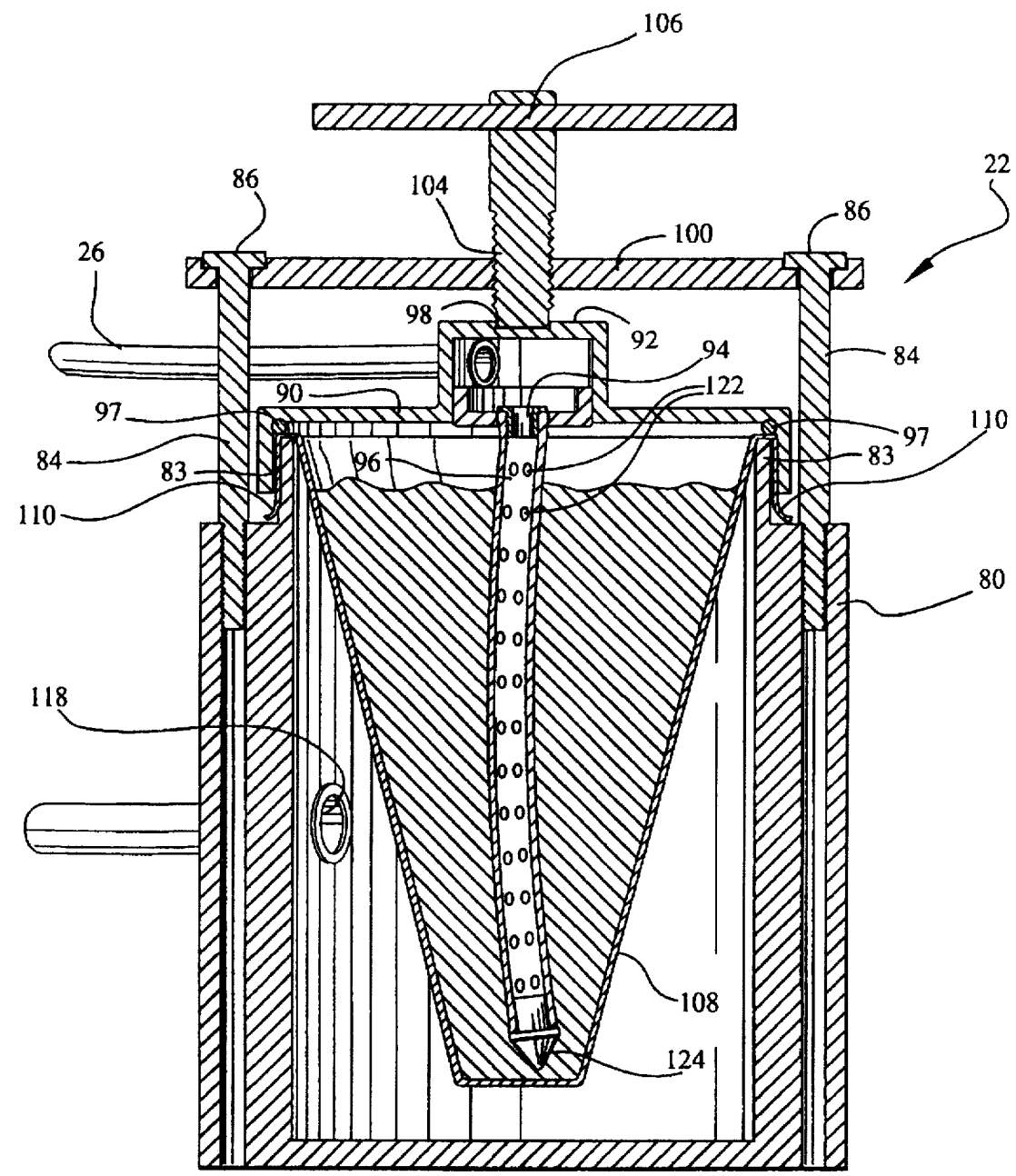
FIG. 15 is a cross-sectional view taken along lines 15—15 in FIG. 14, illustrating the assembly housing a disposable receptacle completely filled with flavouring fluid.

A lid 88 is removably mounted on the projecting neck 83 of the cup-shaped body 80 in order to seal the pressure vessel. The lid comprises a top surface 90 from which depends a circular skirt receiving the neck 83 therein when lid 88 is closed. From the top surface 90 projects a removable central boss 92 to which connects a conduit 26. As best shown in FIG. 15, the boss 92 is hollow to establish a fluid path between an internal nipple 94 to which connects a pick-up tube 96 having a multiple longitudinally extending aperture and the conduit 26. On the top surface of the boss 92 is formed a recess 98. An O-ring 97 is provided at the juncture between the top wall 90 and the depending skirt to engage the rim of the neck 83 and form a fluid-tight seal therewith.

The reservoir 22 further comprises a lid locking assembly including a metallic plate 100 having slots 102 near its longitudinal extremities for engaging the shanks of the locking pins 84. The transverse dimension of each slot 102 is less than the diameter of a head 86 to prevent the heads 86 from passing through the slots 102. The plate 100 also comprises a central aperture 104 in which is threadedly received a bolt 106 having a lower extremity engaging the recess 98 on the lid 88.

Flavouring gel to be dispensed from the reservoir 22 is stored in, a disposable receptacle in the form of a collapsible bag 108 of plastic material. The bag 108 comprises a seamless collar 110 forming the mouth of the bag 108 and a tapered depending body 112 having a pair of side walls 114 united to one another by longitudinally extending seams 116 which converge downwardly toward the bottom wall of the bag 108.

The bag 108 filled with flavouring gel is received within the cup-shaped body 80 and the collar 110 of the bag is folded over the neck 83, as shown in FIG. 15. The lid 88 is installed on the neck 83 and simultaneously the pick-up tube 96 penetrates in the mass of flavouring gel. The plate 100 is then mounted on the locking pins 84 and the bolt 106 is rotated to engage the recess 98 and firmly press the lid 88 against the cup-shaped body 80, while the plate 100 abutting against the heads 86 of the locking pins 84 provides the necessary reaction force.

Compressed air is pumped in the vessel through a port 118 to create a positive pressure around the bag 108 which expels the flavouring gel through the pick-up tube 96. The rate at which the flavouring gel is discharged is regulated by the pressure level in the vessel.

For the proper operation of the reservoir 22 it is critical to achieve a fluid-tight seal between the cup-shaped body 80 and the lid 88. Since the bag 108 forms an integral part of the seal as it is clamped between the lid 88 and the cup-shaped body 80, it is necessary to provide a collar capable to sealingly mate with the O-ring 97 and the rim of the neck 83. The seamless construction of the collar 110 has been found particularly advantageous in this regard by providing an area on the bag which has a relatively constant calliper and is free of major surface defects susceptible to create undesirable leaks.

The tapered configuration of the bag 108 is another important characteristic of this invention. It has been observed that a tapered shape causes the bag 108 to gradually collapse around the pick-up tube 96 while material is removed from the bag, in a way to prevent the formation of isolated pockets of flavouring gel which cannot be evacuated by the pick-Up tube 96. This feature is best shown in FIGS. 15 to 18.

FIG. 15 shows the bag 108 loaded with flavouring gel immediately after it has been installed in the pressure vessel. It should be noted that a small air space may subsist in the bag above the load of flavouring gel.

Figure 16:
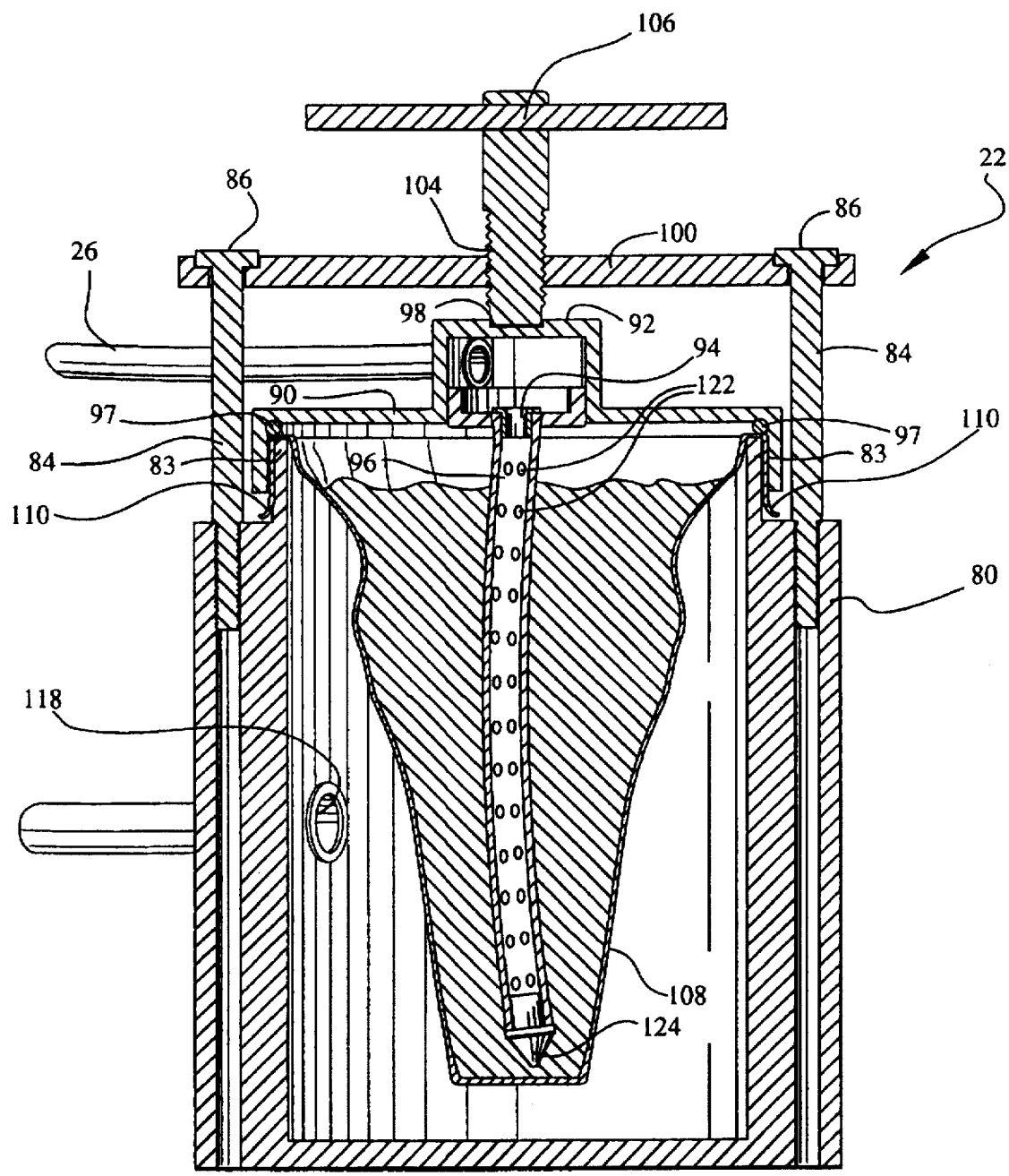
FIGS. 16, 17 and 18 are similar to FIG. 15, showing the disposable receptacle in a progressively collapsed condition as a result of withdrawal of flavouring fluid therefrom.
Figure 17:
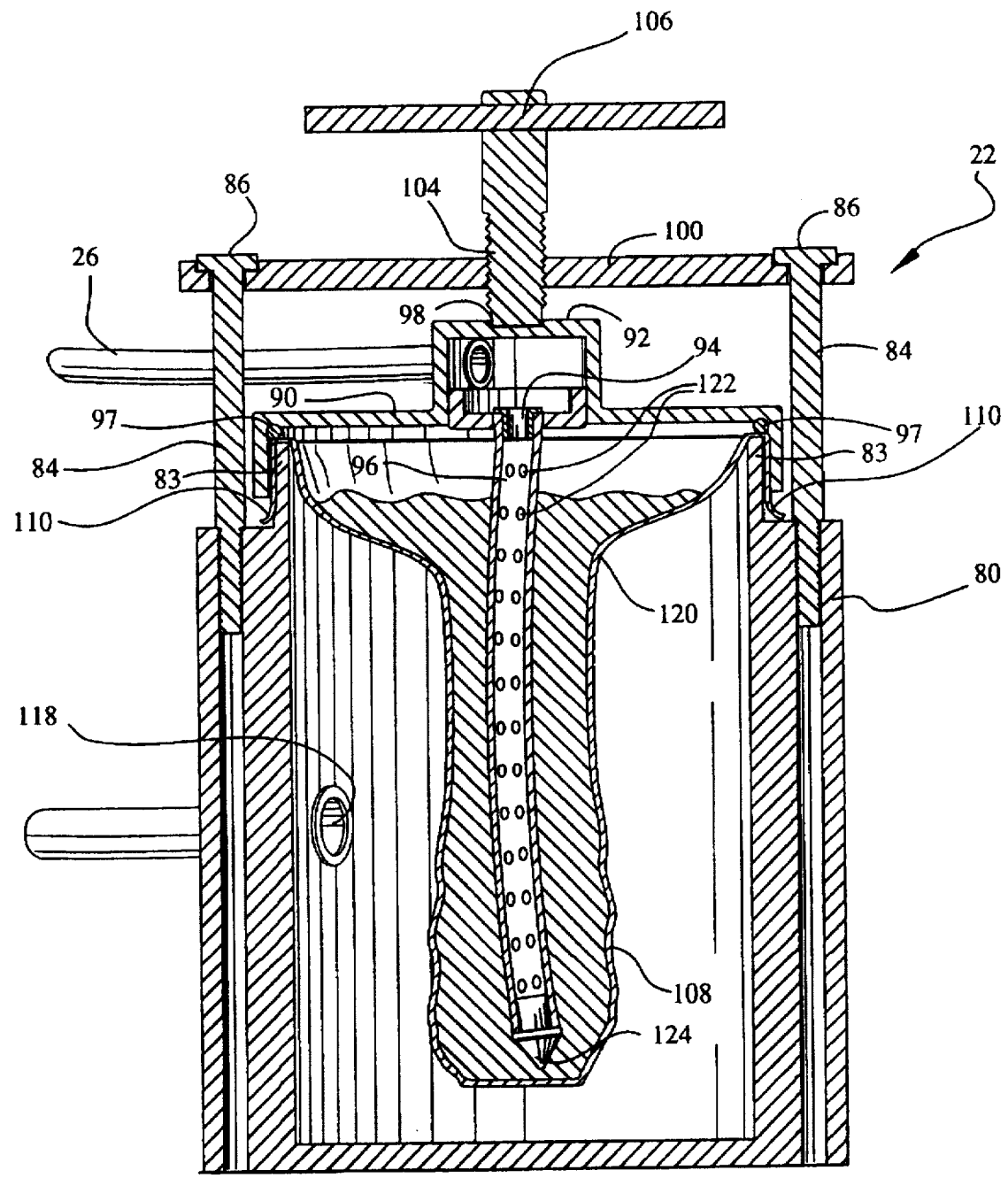
Figure 18:
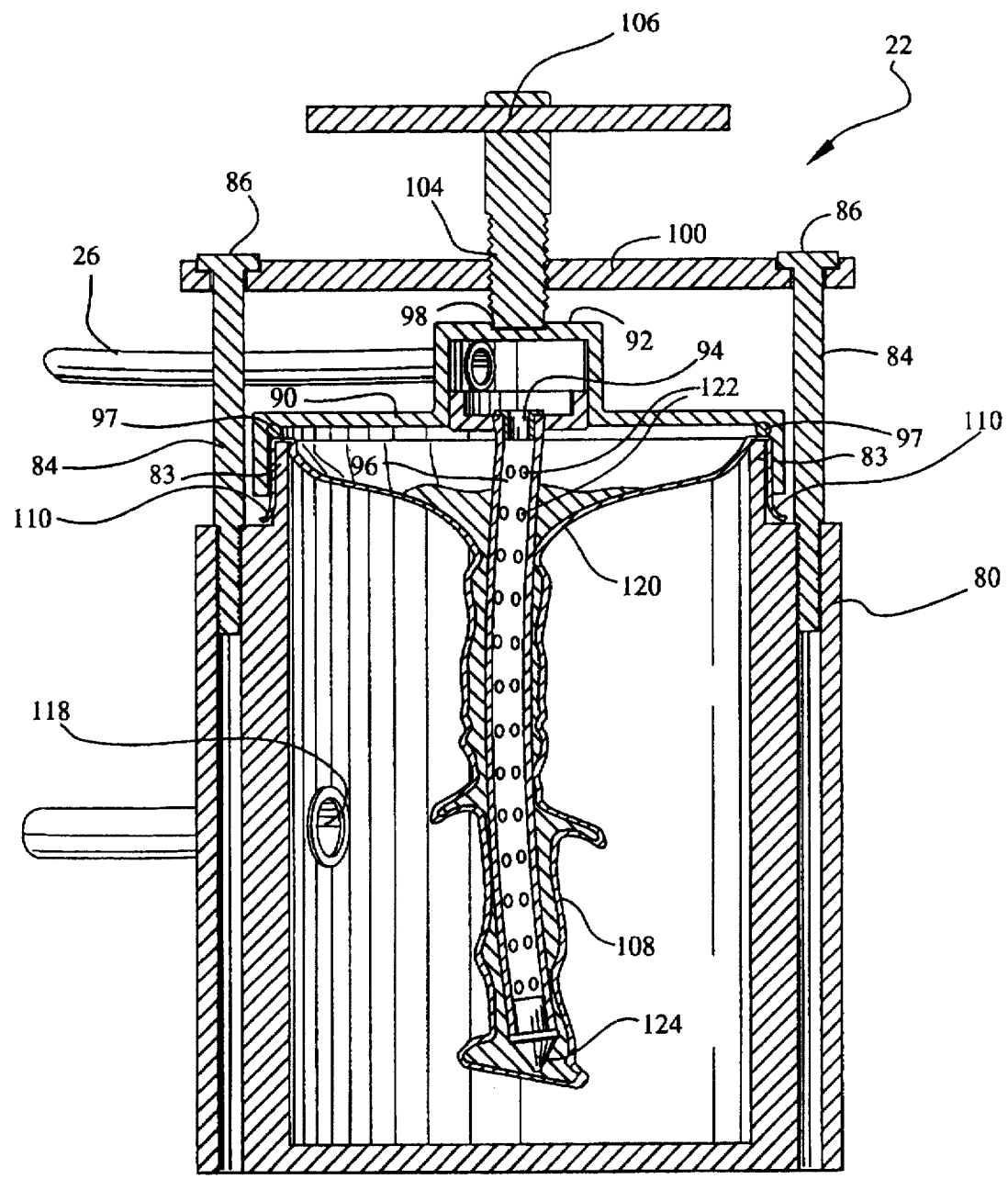
Figure 19:
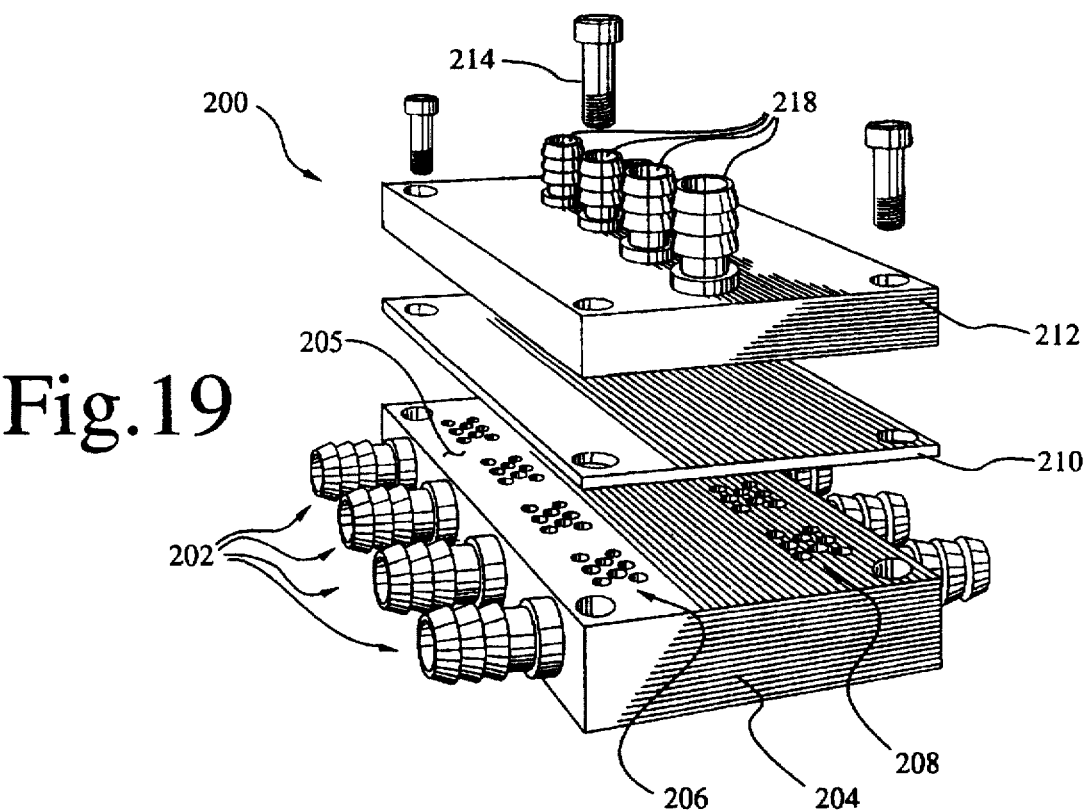
FIG. 19 is an exploded view of a four channel valve bank for controlling the flow of flavouring fluid to the extrusion die of the device shown in FIG. 1, according to a first variant.
Figure 20:
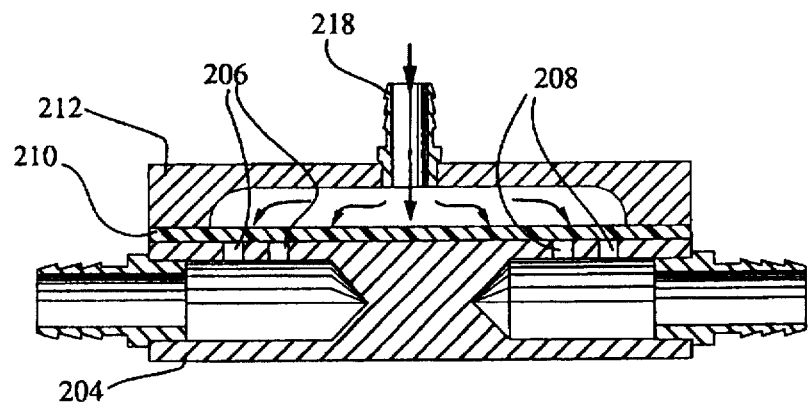
FIG. 20 is a vertical cross-sectional view of a valve unit of the valve bank depicted in FIG. 19, showing the valve unit in the closed position.
Figure 21:
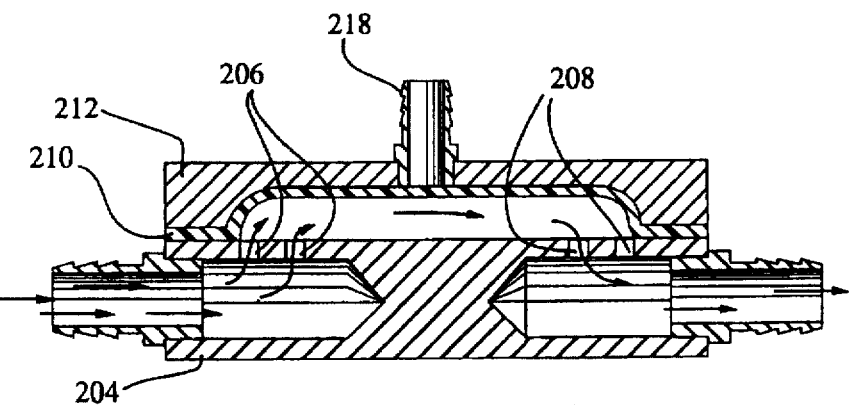
FIG. 21 is a vertical cross-sectional view of a valve unit of the valve bank depicted in FIG. 19, showing the valve unit in the opened position.
Figure 22:
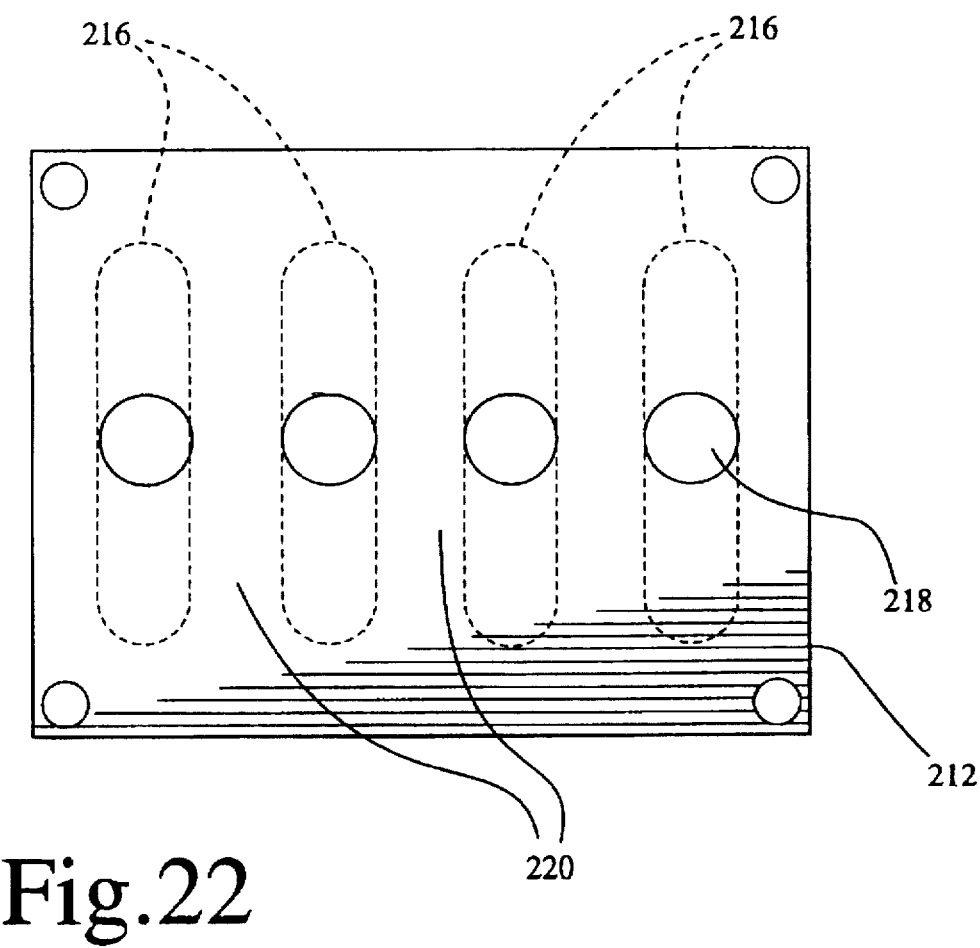
FIG. 22 is a plan view of a cover of the valve bank shown in FIG. 19.
Figure 23:
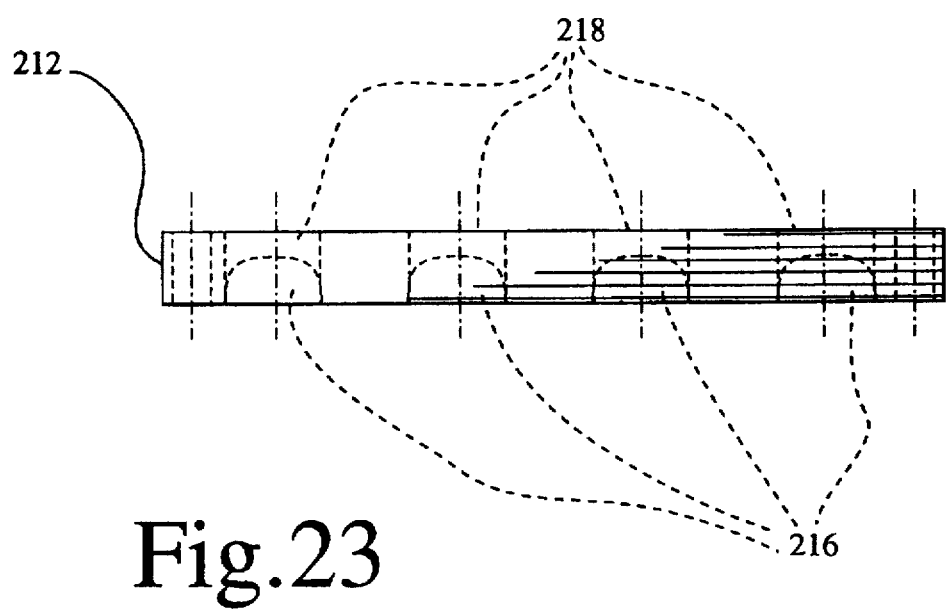
FIG. 23 is a side elevational view of the cover shown in FIG. 22.

In FIG. 16, the vessel has been pressurized by admitting compressed air through the port 118 to cause flavouring gel to be expelled through the pick-up tube 96. It will be appreciated that in the initial stage of the flavouring gel removal operation, the bag 108 begins to collapse in its upper region, forming a narrowed zone 120. As flavouring gel is progressively removed from the bag 108, the narrowed region 120 expands downwardly, forcing the remaining load of flavouring gel to migrate toward the constricting bottom portion of the bag 108, where it is in contact with the pick-up tube 96 and can be completely removed.

In comparison, a bag having a plain rectangular shape cannot be evacuated as completely as the bag in accordance with the invention since in most instances the flavouring gel located at the lower corners, of the bag remains isolated from the pick-up tube as the bag collapses. Accordingly, the bag cannot be completely evacuated, resulting in unnecessary waste of flavouring gel.

The pick-up tube 96 is provided with a plurality of longitudinally arranged openings 122, distributed over its entire surface, to allow flavouring gel to enter the pick-up tube 96 from various longitudinal position thereon. To avoid the bag from being aspirated within the tube 96 when it has been depleted, the tube is closed with a plug 124.

The bag 108 is manufactured from a seamless tube of plastic film which is transversely severed to form a tubular segment corresponding to the length of the bag 108. The walls of the tubular segment are heat-sealed to form the tapered longitudinal seams 116 and the bottom wall of the bag. The heat-seals originate below the upper end of the tubular segment to preserve the seamless configuration of upper region of the tubular segment providing the collar 110.

The operation of the device 10 is as follows.

The ice-cream dispensing machine and the extrusion die 12 to which it is mounted should preferably be operated as a unit by synchronising their controls in order to initiate the discharge of flavouring gel immediately after the ice-cream dispensing machine is actuated. It is not deemed necessary here to describe in detail how control synchronization can be achieved since this would be known to those skilled in the art.

To set the device 10 in the operative mode a compressed air source (not shown in the drawings) is actuated to pressurize the reservoirs 22 and the valve bank 24. A source of water under pressure (not shown in the drawings) is connected to the line 26 feeding the rinsing system of the extrusion die 12.

When the ice-cream dispensing machine is actuated, a supply of ice-cream is forced through the shaping bore 32 to extrude the substrate 18. The valve unit 58 corresponding to the desired flavour is actuated to the opened position to cause the extrusion die 12 to lay the beads 20 of the selected flavouring gel. The flavouring gel is deposited in the recesses of the substrate 18 to form the shaped confection of FIG. 3. When the desired quantity of ice-cream and flavouring gel has been delivered, the operator of the machine interrupts the supply of ice-cream product and simultaneously the valve unit 58 closes to terminate the flow of flavouring gel. As previously described, the closing action generates a momentary suction in the active line 26 to withdraw in the nozzles 38 residues of flavouring gel from the corresponding orifices 42 and prevent the undesirable flavour carry-over during the next dispensing cycle.

From time to time, the operator of the machine actuates the washing system by opening the valve unit 58 controlling the flow in the feed gallery 48, in order to dissolve and flush residues of flavouring gel and ice-cream remaining within the channel 34.

The operation of the extrusion die 300 is essentially the same with a few differences. Most importantly, valves which control the flow of flavoring gel and which can generate vacuum pulses when they close are not required since the washing system is designed to be used at the end of every dispensing cycle. Accordingly, the nozzles 302 are thoroughly clean when the next dispensing cycle is initiated.

To supply the washing medium of aerated water, plain water is supplied to the feed gallery 308 and compressed air is injected in the water supply line (not shown in the drawings) at a location upstream the die body 28. The connection between the water supply line and the compressed air line (not shown in the drawings) can be made by a simple Y connector. It is preferable to provide in the water supply line, upstream of the Y connector a manually operated proportioning valve to regulate the amount of water supplied to the extrusion die 300.

The scope of the present invention is not limited by the description, examples and suggestive uses herein, as modifications can be made without departing from the spirit of the invention. Thus, it is intended that the present application covers the modifications and variations of this invention provided that they come within the scope of the appended claims and their technical equivalents.

I claim:

1. A device for combining plastic edible materials into a striped continuous formed confection having a predetermined cross-sectional shape, said device comprising:
   a body defining a pathway for receiving therethrough a substrate of said striped continuous formed confection comprising an extrudate of host edible material, said body including;
   a) a plurality of nozzles for selectively discharging at least one of a plurality of different supplemental edible materials in said pathway, said plurality of nozzles being in a spaced apart relationship for laying supplemental edible material in a plurality of seams spaced apart from one another on the host edible material, thereby forming a confection of different edible materials combined in co-extensive strips;
   b) a plurality of feed conduits supplied with respective supplemental edible materials, said feed conduits being in fluid-communication with said nozzles for supplying to said nozzles supplemental edible materials;
   c) said plurality of nozzles communicating with said pathway through discharge orifices, whereby each of said discharge orifices is capable of laying on the host edible material different supplemental materials substantially without mixing the host edible material and the supplemental edible material;
   d) a washing medium supply conduit in fluid-communication with said plurality of nozzles for delivering in said nozzles a washing medium to clean said nozzles from residual supplemental edible material; and
   e) each nozzle including an elongated passageway, the washing medium having a direction of flow through said passageway, said feed conduits having discharge ports opening in each nozzle at a location downstream of a discharge port of said supply conduit of said washing medium relative to said direction of flow.

2. A device as defined in claim 1, wherein said body includes a shaping bore upstream of said nozzles relative to a direction of movement of the host edible material along said pathway, said shaping bore extrusion-forming the substrate of host edible material.

3. A device as defined in claim 1, wherein said feed conduits define fluid paths extending around said pathway.

4. A device as defined in claim 3, wherein said fluid paths are generally circular.

5. A device as defined in claim 2, wherein each of said nozzles includes a discharge orifice opening in said pathway, said shaping bore including a peripheral sector with a projection thereon which forms a longitudinally extending recess on the host edible material, each of said nozzles being radially aligned relative each said peripheral sector of said pathway for depositing supplemental edible material in the longitudinal recess of the host edible material.

6. A device as defined in claim 1, comprising means for feeding said washing medium supply conduit with effervescent fluid constituting said washing medium.

7. A device as defined in claim 6, wherein said means for feeding said washing medium supply conduit with effervescent fluid includes means for injecting compressed gas into a body of water to form said effervescent fluid.

8. A device as defined in claim 1, wherein said body includes a bore through which the substrate of host edible material passes, said bore including a discharge end through which the host edible material egresses said body, said nozzle including a discharge orifice opening in said bore for laying on the substrate of edible material a seam of supplemental edible material, said discharge orifice being adjacent said discharge end.

* * * * *